(12) United States Patent
Murakawa et al.

(10) Patent No.: US 7,367,487 B2
(45) Date of Patent: May 6, 2008

(54) METHOD FOR FRICTION STIR WELDING, JIG THEREFOR, MEMBER WITH FRICTION STIR-WELDED PORTION, AND TOOL FOR FRICTION STIR WELDING

(75) Inventors: Toshihiro Murakawa, Utsunomiya (JP); Taisei Wakisaka, Kawachi-gun (JP); Satoshi Ohkubo, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 10/568,991

(22) PCT Filed: Aug. 4, 2004

(86) PCT No.: PCT/JP2004/011144

§ 371 (c)(1),
(2), (4) Date: Feb. 21, 2006

(87) PCT Pub. No.: WO2005/018866

PCT Pub. Date: Mar. 3, 2005

(65) Prior Publication Data

US 2006/0231594 A1    Oct. 19, 2006

(30) Foreign Application Priority Data

| Aug. 22, 2003 | (JP) | ............................. 2003-298360 |
| Jan. 20, 2004 | (JP) | ............................. 2004-011988 |
| Feb. 5, 2004 | (JP) | ............................. 2004-029635 |

(51) Int. Cl.
*B23K 20/12* (2006.01)
*B29C 65/06* (2006.01)

(52) U.S. Cl. ...................... 228/112.1; 228/2.1; 228/2.3; 228/114.5; 156/73.5

(58) Field of Classification Search ................. 228/2.1, 228/4.5, 112.1, 114.5; 156/73.5
See application file for complete search history.

(56) References Cited

U.S. PATENT DOCUMENTS

| 6,029,879 A | 2/2000 | Cocks |
| 6,360,937 B1 * | 3/2002 | De Koning .............. 228/112.1 |
| 2004/0134058 A1 | 7/2004 | Murakami |

FOREIGN PATENT DOCUMENTS

| JP | 2001-259863 | 9/2001 |
| JP | 2002-066760 | 3/2002 |
| JP | 2002-178168 | 6/2002 |
| JP | 2003-062678 | 3/2003 |
| JP | 2003-334671 | 11/2003 |
| JP | 2004-58135 | 2/2004 |
| JP | 2004-141948 | 5/2004 |
| JP | 2004-216421 | 8/2004 |

* cited by examiner

*Primary Examiner*—Sam Chuan Yao
*Assistant Examiner*—Nicholas P D'Aniello
(74) *Attorney, Agent, or Firm*—Rankin, Hill & Clark LLP

(57) ABSTRACT

A recess portion with a substantially circular cross-section is provided in the upper end surface of a supporting jig. When a probe of a device for friction stir welding is buried in the upper end surface of a layered portion, material in the vicinity of the buried portion flows plastically. This causes the plastically flowed material to flow into the recess portion, and as a result, the material is stirred in a relatively large region. When the material that flowed into the recess portion is cooled and solidified, a friction stir-welded portion-possessing member having a projection portion is obtained.

2 Claims, 18 Drawing Sheets

METHOD FOR FRICTION STIR WELDING, JIG THEREFOR, MEMBER WITH FRICTION STIR-WELDED PORTION, AND TOOL FOR FRICTION STIR WELDING

TECHNICAL FIELD

The present invention relates to a friction stir welding method for joining a stacked assembly of stacked members, a jig for use in such a friction stir welding method, a member with a friction-stir-welded joint produced by such a friction stir welding method, and a friction stir welding tool for joining a stacked or abutting assembly of metallic workpieces by friction stir welding.

BACKGROUND ART

Spot welding is generally relied upon to join a stacked assembly of members. In recent years, there has been proposed to join such a stacked assembly by friction stir welding (see, for example, Patent Documents 1 through 3).

FIG. 28 shows a stacked assembly 6 comprising a first workpiece W1 and a second workpiece W2, which are stacked together, and placed on a support jig 3, and a friction stir welding tool 7 having a probe 8 embedded in the stacked assembly 6, in the same manner as with an apparatus shown in FIG. 1 of Patent Document 1. The reference characters A3, M in FIG. 28 designate a stirred region which is stirred by the probe 8 and a boundary line between the first workpiece W1 and the second workpiece W2, respectively.

When the stacked assembly is friction-stir-welded, even if the probe 8 is embedded and the material flows plastically, the material cannot project from the lower end face of the first workpiece W1. Therefore, the material of the second workpiece W2 flows plastically to a position near a peripheral side wall of a rotor 9 of the friction stir welding tool 7, and rises to form an annular burr BL. Therefore, a finishing process is required to cut the burr BL away.

As shown in FIG. 29, since the thickness T3 of a region that is compressed by the embedded probe 8 and the thickness T4 of a region of the workpiece W2 directly above a raised portion of the lower workpiece W1 near the embedded probe 8 are reduced, the bonding strength of the stacked assembly 6 is not sufficient.

Furthermore, because the probe 8 is removed after it has been embedded to plastically flow the material in the friction stir welding process, a hole is left in the region from which the probe 8 is removed, tending to reduce the bonding strength of the stacked assembly 6.

To avoid the difficulty that the hole is left in the region from which the probe 8 is removed, Patent Document 2 discloses a technology for holding jigs in abutment against opposite end faces of a stacked assembly, and providing friction stir welding jigs on the sides of the opposite end faces. Specifically, a probe inserted in a through hole in the jig on one side of the end faces is embedded in the stacked assembly to perform a friction stir welding process. Thereafter, the material which flows into a through hole in the jig on the other side of the end faces when the probe is embedded, is pushed back by a probe provided on the other side of the end faces. The projecting material is thus pushed back until the bottom of the hole produced by the removed probe becomes flat, thereby producing flat surfaces.

According to a technology disclosed in Patent Document 3, a stacked assembly is placed on a flat surface of a jig, and an additional material piece is supplied to a region around a probe that is rotated and embedded in the stacked assembly. The additional material piece is welded together with the stacked assembly, filling the hole produced by the removed probe.

The technology disclosed in Patent Document 2 is disadvantageous in that since the two friction stir welding tools need to be installed in opposite directions, the friction stir welding apparatus is complex in structure and the facility investment is expensive.

The technology disclosed in Patent Document 3 results in an increase in the material cost and hence the friction stir welding cost on account of the need for the additional material piece. In addition, because there is a need for a mechanism for supplying the additional material piece, the friction stir welding apparatus is also complex in structure and the facility investment is also expensive.

As shown in FIG. 30, it may be proposed to insert a placement jig 2 having a recess 1 into an insertion cavity 4 in a support jig 3, thereby providing a friction stir welding jig 5. When a stacked assembly 6 comprising a first workpiece W1 and a second workpiece W2 is placed over the recess 1 in the placement jig 2, and a probe 8 of a friction stir welding tool 7 is embedded in the stacked assembly 6, the material of a region A4 is softened to flow plastically, and the material finally flows into the recess 1. Since the material displaced by the embedded probe 8 flows into the recess 1, a burr BL is prevented from being produced. Because the plastically flowing material projects from the lower end face of the stacked assembly, the thickness of the joined stacked assembly 6 is not reduced, and the desired bonding strength is achieved.

Patent Document 1: Japanese Laid-Open Patent Publication No. 2002-178168
Patent Document 2: Japanese Laid-Open Patent Publication No. 2001-259863
Patent Document 3: Japanese Laid-Open Patent Publication No. 2003-62678

DISCLOSURE OF THE INVENTION

PROBLEMS TO BE SOLVED BY THE INVENTION

However, even if the friction stir welding jig 5 shown in FIG. 30 is used, the bonding strength of the stacked assembly 6 may not be sufficient. The reason is that, as shown in FIG. 31, it is difficult to keep an axis L1 passing through the center of the recess 1 defined in the placement jig 2 and an axis L2 passing through the center of the friction stir welding tool 7 (the probe 8) in alignment with each other.

If the friction stir welding process is continued while the axis L1 and the axis L2 are being kept out of alignment with each other, i.e., while the jigs are being out of coaxial with each other, there occurs a region B1 where the distance between the peripheral side wall of the probe 8 and the inner peripheral wall of the recess 1 is larger and a region B2 where the distance between the peripheral side wall of the probe 8 and the inner peripheral wall of the recess 1 is smaller, as shown in FIG. 30. The material is well stirred in the region B2 where the distance between the peripheral side wall of the probe 8 and the inner peripheral wall of the recess 1 is smaller. However, because the amount of stirred material is reduced in the region B1 where the distance is larger, the level of friction stir welding becomes insufficient, resulting in reduction in the bonding strength.

To eliminate the above drawback, so-called coaxial alignment may be formed in advance to align the axis L1 and the axis L2 with each other as much as possible. However, coaxial alignment requiring precision is complicated. If the axes are brought out of alignment with each other due to some disturbance after a coaxial alignment process has been finished, then another coaxial alignment process has to be performed again. Accordingly, the efficiency of the friction stir welding process is lowered.

It is a general object of the present invention to provide a friction stir welding method which increases the efficiency of a friction stir welding process and increases the bonding strength of a welded joint without making a friction stir welding apparatus complex.

A major object of the present invention is to provide a friction stir welding jig for use in such a friction stir welding method.

Another object of the present invention is to provide a member with a friction-stir-welded joint produced by such a friction stir welding method.

Still another object of the present invention is to provide a friction stir welding tool which is suitable for use in such a friction stir welding method, for example.

MEANS FOR SOLVING THE PROBLEMS

According to a first aspect of the present invention, there is provided a friction stir welding method for supporting an end face of a stacked assembly made up of a plurality of members with a support jig and embedding a probe of a friction stir welding tool into another end face of the stacked assembly to friction-stir-weld the stacked assembly, comprising the steps of:

providing a recess in the support jig; and rotating the probe and embedding it into the other end face of the stacked assembly toward the recess thereby to join the stacked assembly over the recess and to provide a land projecting in the direction in which the probe is embedded, on the end face of the stacked assembly.

The recess is provided in the support jig, and when the stacked assembly is friction-stir-welded, the material of the stacked assembly flows into the recess. The stacked assembly is thus depressed, allowing much of the material thereof to be stirred. In an unstirred region where the material is not stirred, a protrusion formed when the upper member is depressed fits in the depressed region of the lower member due to plastic deformation. In a stirred region, at the same time, a large amount of the material of abutting areas of the stacked members flows plastically. A joint that is formed when the material is cooled and solidified has a better bonding strength because of the fitting engagement and the friction stir welding.

The stacked assembly is prevented from producing burrs. Because the stacked assembly does not need to be finished after it has been friction-stir-welded, the machining time is shortened and thus the machining efficiency is increased.

Preferably, the land has a portion having a substantially circular horizontal cross section, and the horizontal cross section has a diameter greater than an outside diameter of the probe. With this arrangement, the material can easily flow into the recess. As a result, when the stacked assembly is friction-stir-welded, a large amount of the material of abutting areas of the stacked members can be stirred, resulting in increase in the bonding strength of the joint.

According to a second aspect of the present invention, there is also provided a friction stir welding support jig for supporting an end face of a stacked assembly made up of a plurality of members when the stacked assembly is friction-stir-welded, comprising:

a recess for accommodating therein the material of the stacked assembly which plastically flows from the end face of the stacked assembly in the direction in which a probe of a friction stir welding tool is embedded into another end face of the stacked assembly while the probe is rotating.

When the stacked assembly is friction-stir-welded using the support jig, the material of the stacked assembly flows into the recess. As a result, abutting portions of the stacked members are well stirred, producing a joint having increased bonding strength.

According to a third aspect of the present invention, there is also provided a member with a friction-stir-welded joint produced when a stacked assembly made up of a plurality of members is friction-stir-welded, comprising:

a land which projects on an end face of the stacked assembly when a probe of a friction stir welding tool is embedded into another end face of the stacked assembly.

The land is formed when the plastically flowing material is cooled and solidified after having flowed into the recess of the support jig at the time the stacked members are joined by the friction stir welding tool. The friction-stir-welded joint exhibits an excellent bonding strength.

According to a fourth aspect of the present invention, there is also provided a friction stir welding method for supporting a stacked assembly made up of a plurality of members with a placement jig which is inserted in an insertion recess in a support jig with a clearance defined therebetween and which has a recess defined in an upper end face thereof, and embedding a probe of a friction stir welding tool into an upper end face of the stacked assembly to friction-stir-weld the stacked assembly, comprising the step of:

displacing the support jig in the insertion recess in a direction to bring the center of the recess of the placement jig into alignment with the center of the probe when the probe is rotated and embedded into the upper end face of the stacked assembly toward the recess of the placement jig to friction-stir-weld the stacked assembly over the recess.

According to the present invention, when the probe is embedded into the stacked assembly, the center of the probe and the center of the placement jig are brought into alignment with each other. Stated otherwise, the probe is coaxially aligned with the placement jig when the probe is embedded into the stacked assembly. Therefore, it is not necessary to perform a complicated coaxial alignment process in advance, and hence the efficiency of the friction stir welding process is increased.

When the stacked assembly is friction-stir-welded as described above, the material of the stacked assembly which exists around the probe is uniformly stirred regardless of the region. Therefore, since there is no region where the amount of stirred material is small, there is no region where the bonding strength is small. For these reasons, the stacked assembly with the large bonding strength is provided.

As the probe is embedded, the stacked workpieces are joined to each other through a protruding region and a depressed region, resulting in a tightly fit state. This also increases the bonding strength of the stacked assembly.

Because the material plastically flows into the recess of the placement jig, the stacked assembly is prevented from producing burrs.

According to a fifth aspect of the present invention, there is also provided a friction stir welding jig for friction-stir-welding a stacked assembly made up of a plurality of members, comprising:

a placement jig having a recess defined in an upper end face thereof, for placing the stacked assembly thereon;

a support jig having an insertion recess defined therein for inserting the placement jig therein; and an elastic body interposed between the support jig and a portion of the placement jig which is inserted in the insertion recess with a clearance defined therebetween.

With this arrangement, when the probe is embedded into the stacked assembly, the center of the probe and the center of the placement jig are brought into coaxial alignment with each other. Therefore, the efficiency of the friction stir welding process is increased, and the bonding strength of the stacked assembly is increased.

The interposed elastic body allows the placement jig to be displacable in the insertion recess. Because the placement jig is displacable in the insertion recess, the friction stir welding jig is not complicated in structure. That is, the friction stir welding jig is of a simple structure.

According to a fifth aspect of the present invention, there is further provided a friction stir welding tool for friction-stir-welding abutting portions of a plurality of metal workpieces, comprising:

a rotor for pressing the workpieces; and a probe disposed coaxially on a tip end of the rotor, for being inserted into the workpieces;

the probe comprising:

a first screw section disposed on a tip end of the probe and having a helical shape; and a second screw section disposed behind the first screw section and having a helical shape oriented opposite to the first screw section.

Because the first and second screw sections have oppositely oriented threads, when the first screw section on the tip end of the probe is rotated in a direction to be threaded into the workpieces, the workpieces can be joined together with a greater bonding strength.

If the workpieces are stacked together, and the distance from a boundary line between the first screw section and the second screw section to an end face of the rotor is substantially equal to the thickness of one workpiece on a face side among the workpieces, then mating surfaces of the workpieces can be reliably joined to each other.

If the first screw section and the second screw section have equal screw pitches, and the first screw section and the second screw section have equal axial lengths, then a downward force produced by the first screw section and an upward force produced by the second screw section are brought into balance. The workpieces are thus prevented from being lifted or lowered, and plastic material flow by the first screw section and plastic material flow by the second screw section are caused in balance, promoting plastic material flow near the boundary line between the first screw section and the second screw section.

If each of the first screw section and the second screw section has thread contiguous to each other, then plastic material flow near the boundary line is further accelerated.

BEST MODE FOR CARRYING OUT THE INVENTION

Preferred embodiments of a friction stir welding method according to the present invention, in relation to a support jig and a friction stir welding tool that are used to carry out the friction stir welding method, and a finally produced member with a friction-stir-welded joint, will be described in detail below with reference to the accompanying drawings.

First, a first embodiment will be described below.

Figure 1:
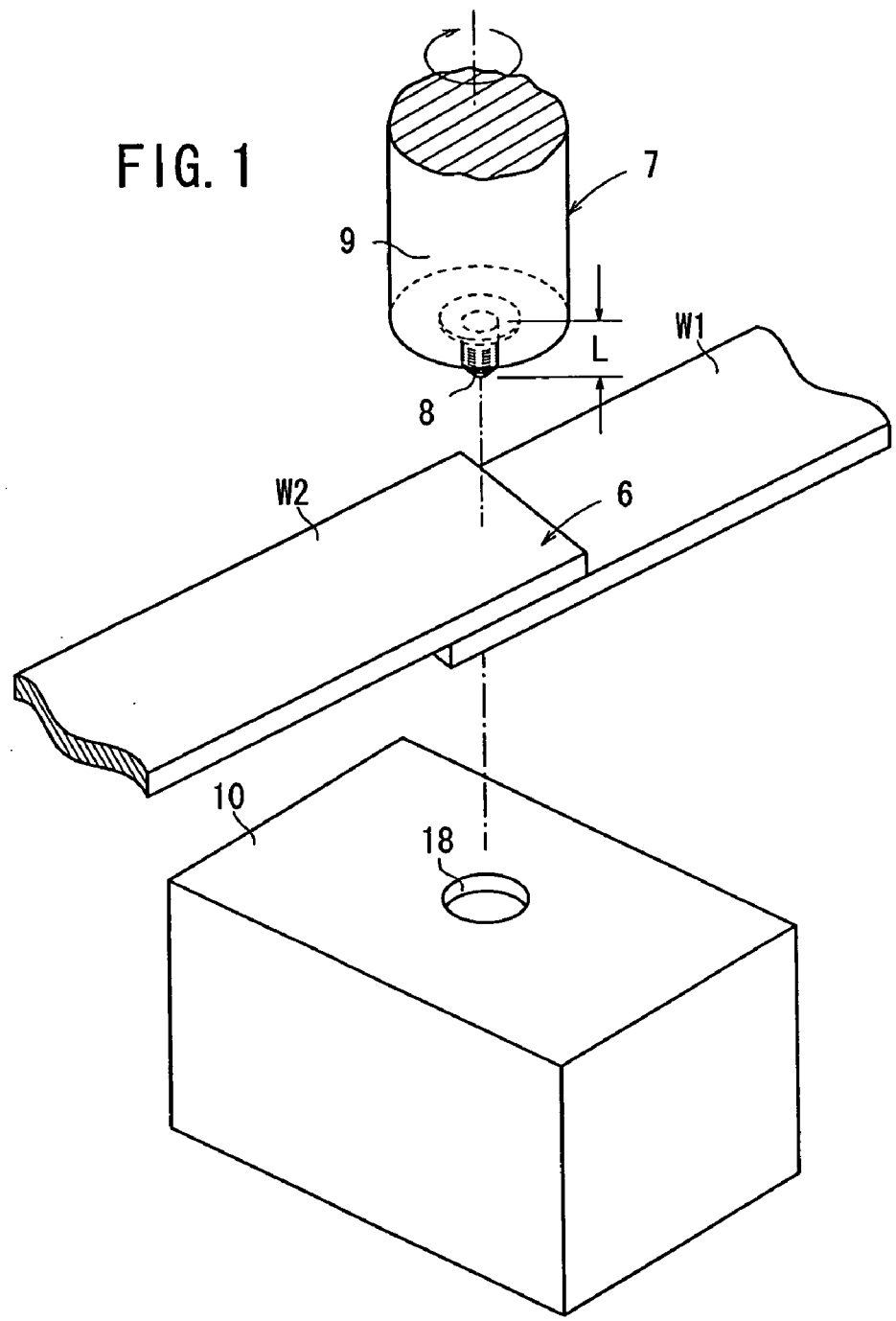
FIG. 1 is an enlarged fragmentary schematic perspective view of a support jig for carrying out a friction stir welding method according to a first embodiment of the present invention, a first workpiece and a second workpiece which are to be friction-stir-welded, and a friction stir welding tool.
Figure 2:
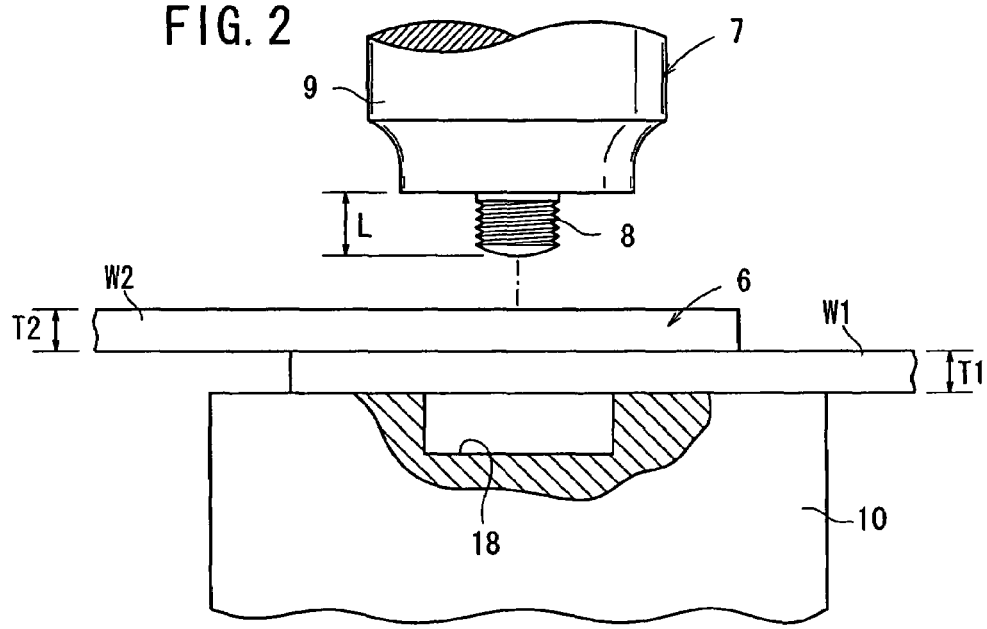
FIG. 2 is an enlarged view, partly in vertical cross section, showing the manner in which a stacked assembly is placed on the support jig shown in FIG. 1.

FIG. 1 is an enlarged fragmentary schematic perspective view of a support jig 10, a first workpiece W1 and a second workpiece W2 which are made of so-called 5000 aluminum denoted by 5000s according to JIS, and a friction stir welding tool 7, and FIG. 2 is an enlarged view, partly in vertical cross section, showing the manner in which a stacked assembly is placed on the support jig shown in FIG. 1. The support jig 10 is substantially in the shape of a rectangular parallelepiped, and has a recess 18 defined substantially centrally in an upper end face thereof. The recess 18 has a substantially hollow cylindrical shape having a substantially circular horizontal cross-section.

The first workpiece W1 and the second workpiece W2 are stacked one on the other, providing a stacked assembly 6. The stacked assembly 6 is friction-stir-welded in covering relation to the recess 18, as described later on.

The friction stir welding tool 7 has a rotor 9 and a probe 8 coupled to an end of the rotor 9 and having a conically curved distal end. The probe 8 has an outside diameter smaller than the diameter of the recess 18 defined in the support jig 10. Stated otherwise, the diameter of the recess 18 is greater than the outside diameter of the probe 8. The length L of the probe 8, the thickness T1 (see FIG. 2) of the first workpiece W1, and the thickness T2 of the second workpiece W2 are set respectively to about 2.5 mm, about 1.5 mm, and about 1.0 mm, for example.

The friction stir welding tool 7 is disposed such that its axis is substantially aligned with the axis of the recess 18. The probe 8 is positioned above the recess 18.

According to the first embodiment, the friction stir welding is performed as follows:

First, as shown in FIG. 2, the first workpiece W1 and the second workpiece W2 are stacked to form the stacked assembly 6, which is placed on the support jig 10. At this time, the stacked assembly 6 covers the recess 18.

Figure 3:
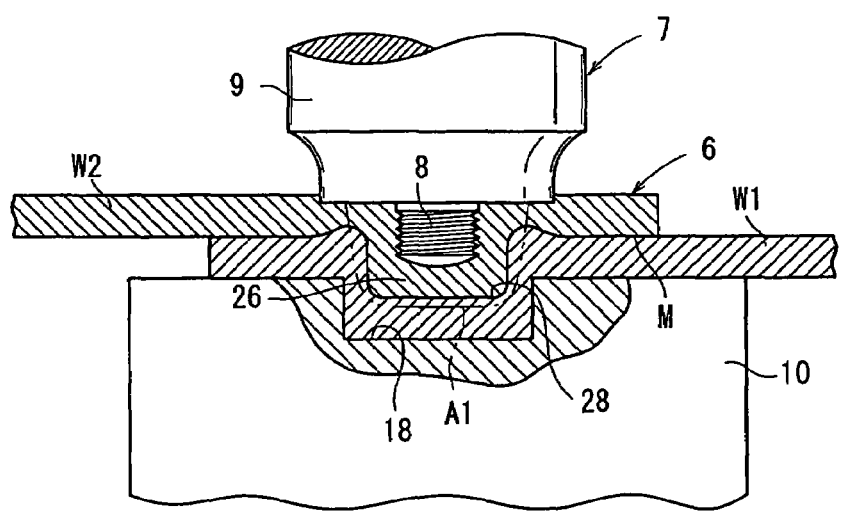
FIG. 3 is an enlarged view, partly in vertical cross section, showing the manner in which the friction stir welding tool has a probe embedded in the stacked assembly shown in FIG. 2.

Then, the friction stir welding tool 7 is lowered to a position that is spaced a predetermined distance from the stacked assembly 6. Thereafter, the rotor 9 is rotated, and the probe 8 is brought into sliding contact with the upper end face of the stacked assembly 6 (the upper end face of the second workpiece W2). As the probe 8 is held in sliding contact with the upper end face of the stacked assembly 6, frictional heat is generated to soften the area of the stacked assembly 6 contacted by the probe 8 and a nearby area. As a result, as shown in FIG. 3, the probe 8 is embedded in the stacked assembly 6, and the material of the stacked assembly 6 flows into the recess 18. The material of the stacked assembly 6 easily flows into the recess 18 because the diameter of the horizontal cross section of the recess 18 is greater than the diameter of the probe 8, as described above.

As the probe 8 rotates, the material of a stirred region A1 of the stacked assembly 6 is stirred. Since the material of the stacked assembly 6 has flowed into the recess 18, the material of the contacted region is stirred in a large amount.

As the probe 8 is embedded, a protrusion 26 is formed on the surface of the second workpiece W2 which faces the first workpiece W1, and a cavity 28 is formed in the surface of the first workpiece W1 which faces the second workpiece W2. The protrusion 26 fits in the cavity 28. The lower end of the cavity 28 in FIG. 3 is an unstirred region (plastically deformed region) where the material does not flow plastically. That is, the lower end of the cavity 28 in FIG. 3 is shaped complementarily to the recess 18 due to plastic deformation.

Figure 28:
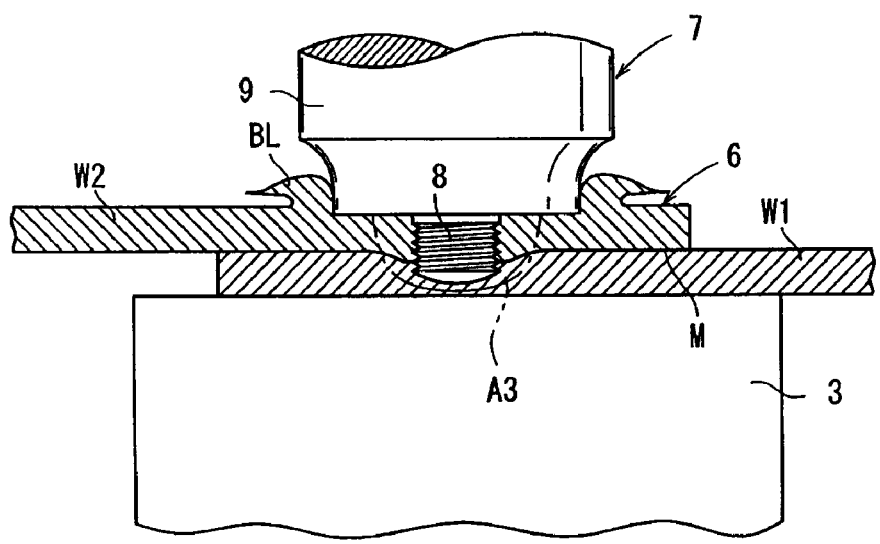
FIG. 28 is an enlarged view, partly in vertical cross section, showing the manner in which a conventional friction stir welding method is carried out by a probe that is embedded in a stacked assembly placed on a general support jig free of a recess.
Figure 29:
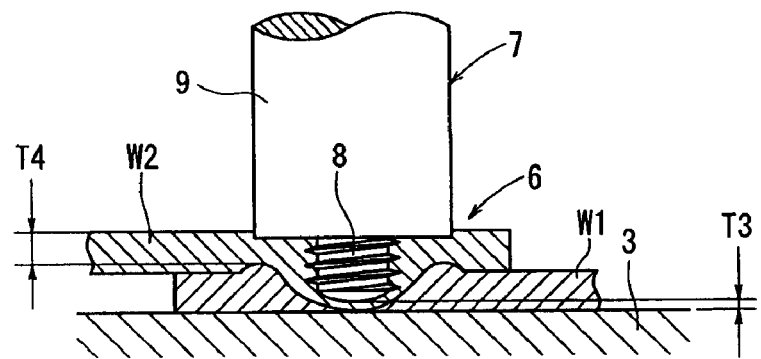
FIG. 29 is an enlarged view, partly in vertical cross section, showing the manner in which a conventional friction stir welding method is carried out by a probe that is embedded in a stacked assembly placed on a general support jig free of a recess.
Figure 30:
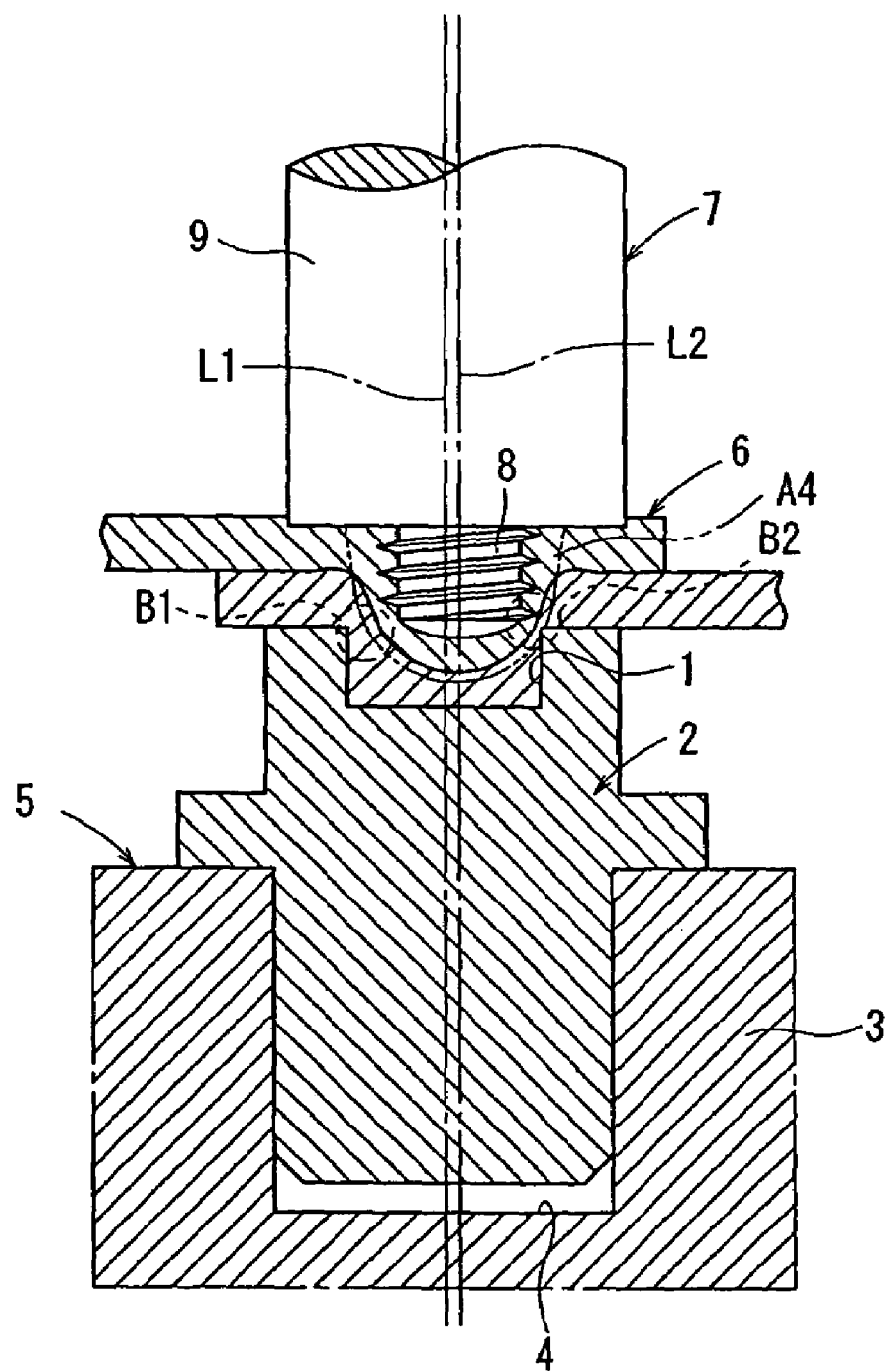
FIG. 30 is an enlarged view, partly in vertical cross section, showing the manner in which a stacked assembly is friction-stir-welded using a friction stir welding jig having a placement jig that cannot be displaced.
Figure 31:
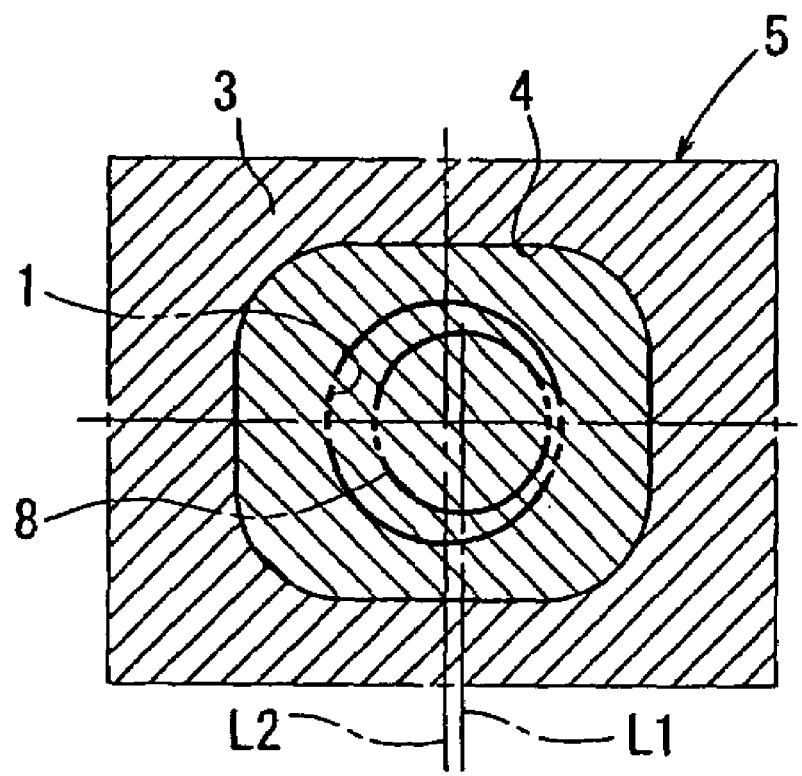
FIG. 31 is a schematic transverse cross-sectional view showing the manner in which the axis of a recess in the placement jig shown in FIG. 30 and the axis of a probe are not aligned with each other.

A comparison of FIGS. 3 and 28 clearly shows that the stirred region A1 which is stirred by the probe 8 according to the first embodiment is wider than the stirred region A3 shown in FIG. 28. Therefore, more of a boundary line M between the first workpiece W1 and the second workpiece W2 is included in the stirred region A1 (see FIG. 3) than in the stirred region A3 (see FIG. 28). Stated otherwise, the friction stir welding method according to the first embodiment makes it possible to stir the boundary line M between the first workpiece W1 and the second workpiece W2 over a longer distance than the conventional friction stir welding method.

According to the conventional process which does not allow the stacked assembly 6 to be depressed, the burr BL (see FIG. 28) is formed. According to the present embodiment, however, as shown in FIG. 3, the material pushed from the stacked assembly 6 by the embedding probe 8 flows plastically into the recess 18. Therefore, the material of the stacked assembly 6 does not rise, and hence does not produce the burr BL.

Using the support jig 10 having the recess 18, the stacked assembly 6 can be friction-stir-welded without forming the burr BL.

Figure 4:
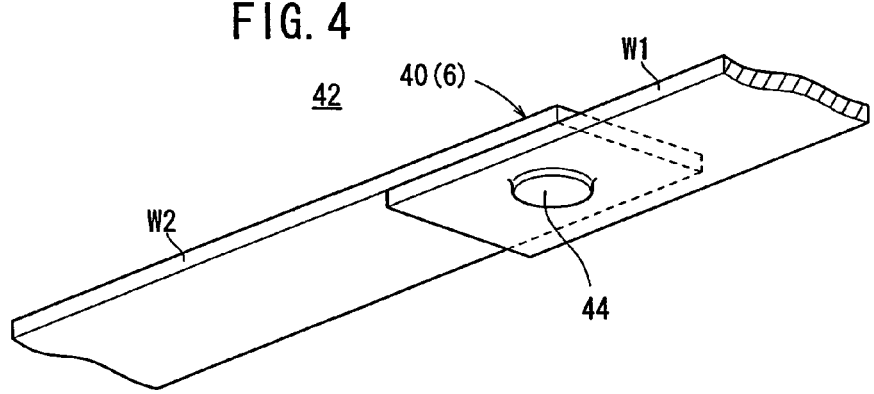
FIG. 4 is a fragmentary perspective view of a member with a friction-stir-welded joint produced by the friction stir welding method according to the first embodiment.

When the probe 8 is released about 2 seconds after the stacked assembly 6 has started being stirred, thereby stopping the plastic flow of the material of the stacked assembly 6, the material of the stacked assembly 6 including the boundary line M is finally cooled and solidified. In this manner, the first workpiece W1 and the second workpiece W2 are integrally joined together in a solid state, producing a member 42 with a friction-stir-welded joint 40, as shown in FIG. 4. The member 42 with the friction-stir-welded joint 40 has a cylindrical land 44 that projects on one end face thereof when the material that has flowed in the recess 18 is cooled and solidified. Therefore, the outside diameter of the land 44 is substantially the same as the diameter of the recess 18.

Figure 5:
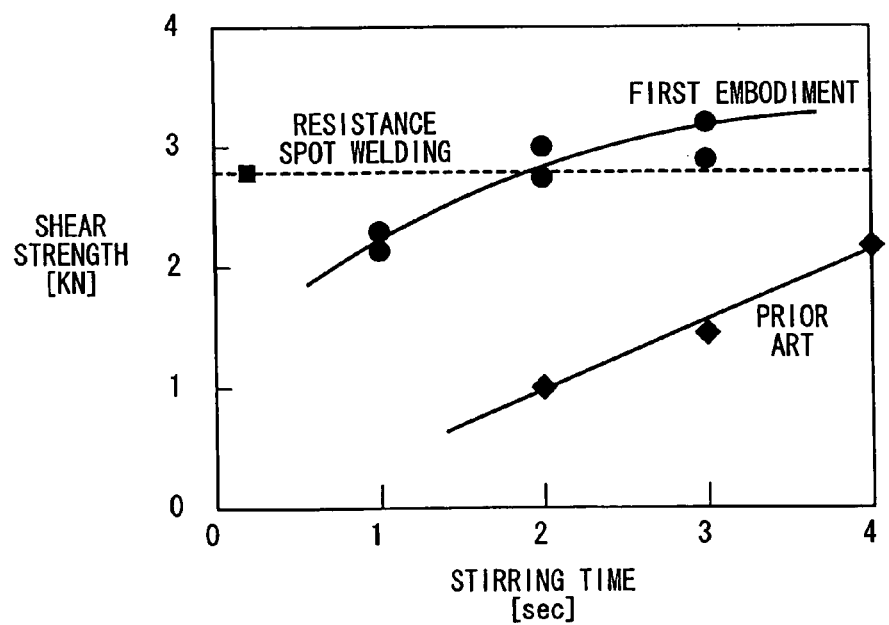
FIG. 5 is a graph showing the relationship between the stirring time and the shear strength of a general member with a friction-stir-welded joint produced by a friction stir welding method shown in FIG. 28 and the member with the friction-stir-welded joint according to the first embodiment.
Figure 6:
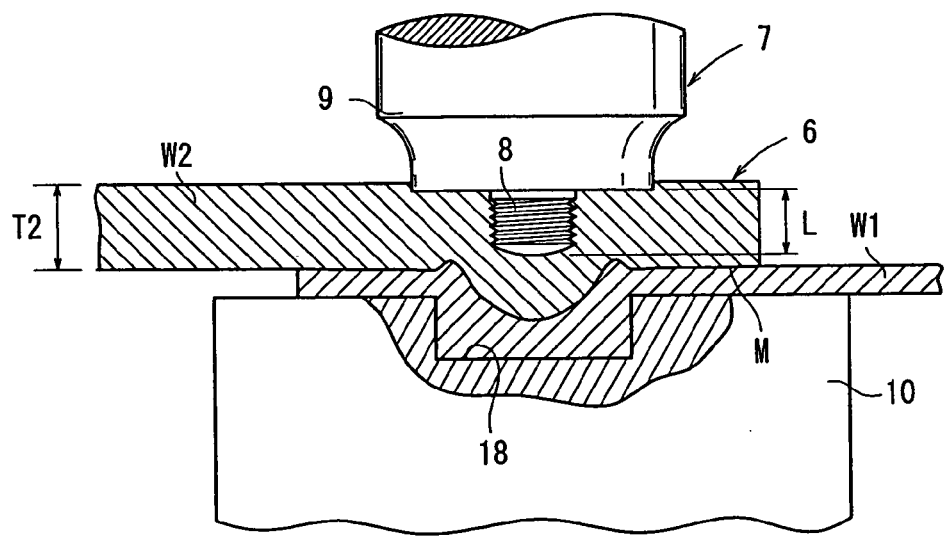
FIG. 6 is an enlarged view, partly in vertical cross section, showing the manner in which a member having a thickness that is large compared with the length of a probe is friction-stir-welded.

The shear strength of the friction-stir-welded joint 40 of the member 42 and the shear strength of the friction-stir-welded joint produced by the conventional friction stir welding method shown in FIG. 28 are illustrated in FIG. 5. In FIG. 5, the horizontal axis represents a stirring time.

As shown in FIG. 5, if the stirring time is the same, then the shear strength of the friction-stir-welded joint 40 is much greater than the shear strength of the conventional friction-stir-welded joint, and is about the same as the shear strength of a joint produced by a resistance spot-welding process using an electrode having a diameter of 6 mm. According to the present embodiment, therefore, it is possible to produce a member 42 with a friction-stir-welded joint having excellent bonding strength. The reason for this is that the stacked assembly 6 is firmly joined by the friction stir welding, and the protrusion 26 of the second workpiece W2 fits in the cavity 28 in the first workpiece W1, as shown in FIG. 3. Specifically, the lower end of the cavity 28 is shaped complementarily to the recess 18 due to plastic deformation, resulting in a tightly fit state. Since the first workpiece W1 and the second workpiece W2 are firmly joined to each other, the bonding strength increases.

As can be seen from FIG. 28, the length L of the probe 8 has to be larger than the thickness T2 of the second workpiece W2 according to the conventional friction stir welding method. If the length L of the probe 8 is smaller than the thickness T2, then since the tip end of the embedded probe 8 does not reach the boundary line M, the material of the first workpiece W1 is not stirred, and the first workpiece W1 and the second workpiece W2 are not joined together in a solid state. In addition, the sum of the thickness T1 and the thickness T2 of the second workpiece W2 has to be smaller than the length L of the probe 8 so that the embedded probe 8 will not reach the support jig.

In the friction stir welding method according to the first embodiment, even if the length L of the probe 8 is smaller than the thickness T2, as the probe 8 is embedded in the second workpiece W2, the second workpiece W2 is depressed, pushing the boundary line M into the first workpiece W1. In the vicinity of the depressed region of the boundary line M, when the probe 8 is rotated, the material of the second workpiece W2 is stirred, and the material of the first workpiece W1 is also stirred. Therefore, the stacked assembly 6 is joined in a solid state, providing the friction-stir-welded joint 40.

Figure 7:
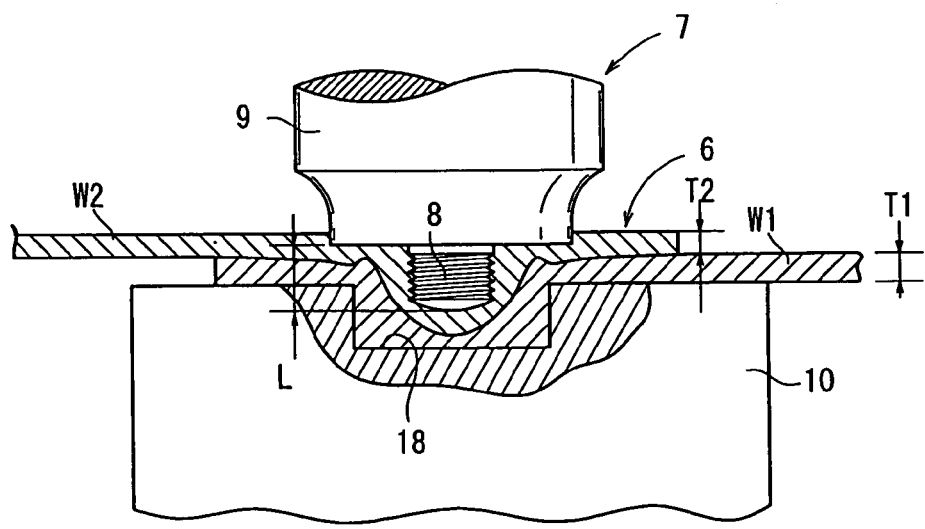
FIG. 7 is an enlarged view, partly in vertical cross section, showing the manner in which a member having a thickness that is small compared with the length of a probe is friction-stir-welded.

Even if the length L of the probe 8 is greater than the sum of the thickness T1 and the thickness T2 as shown in FIG. 7, since the material of the depressed stacked assembly 6 only flows into the recess 18, the tip end of the probe 8 does not reach the support jig 10. Consequently, the stacked assembly 6 and the support jig 10 do not interfere with each other.

According to the present embodiment, therefore, it is possible to friction-stir-weld workpieces having various thicknesses. It is not necessary to replace the friction stir welding tool being used with a friction stir welding tool having dimensions corresponding to the thicknesses of workpieces to be joined. The complicated tool replacing process does not need to be carried out, and friction stir welding tools of various dimensions do not need to be prepared. Accordingly, the cost of the friction stir welding process is reduced.

Figure 8:
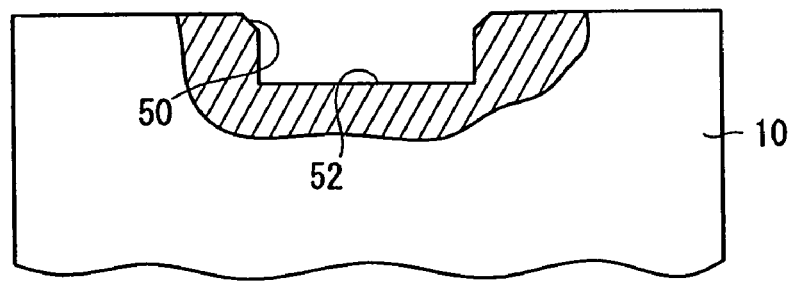
FIG. 8 is a fragmentary vertical cross-sectional view showing a recess with a taper in the vicinity of an opening thereof.
Figure 9:
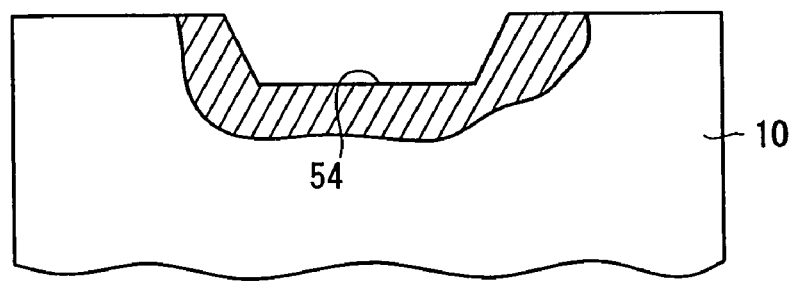
FIG. 9 is a fragmentary vertical cross-sectional view showing a recess whose diameter is progressively reduced to provide a tapered shape.
Figure 10:
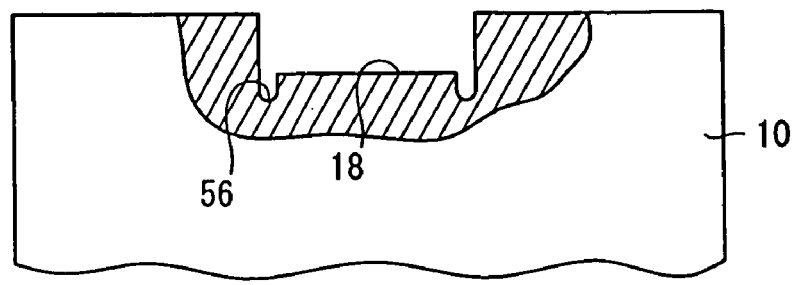
FIG. 10 is a fragmentary vertical cross-sectional view showing a recess having an annular groove defined in the bottom thereof.

The recess is not limited to the cylindrical recess 18. However, the recess may be a recess 52 having a taper 50 in the vicinity of its opening, as shown in FIG. 8, or may be a recess 54 whose diameter is progressively reduced to provide a tapered shape, as shown in FIG. 9, or may have an annular groove 56 defined in the bottom of the recess 18, as shown in FIG. 10.

Figure 11:
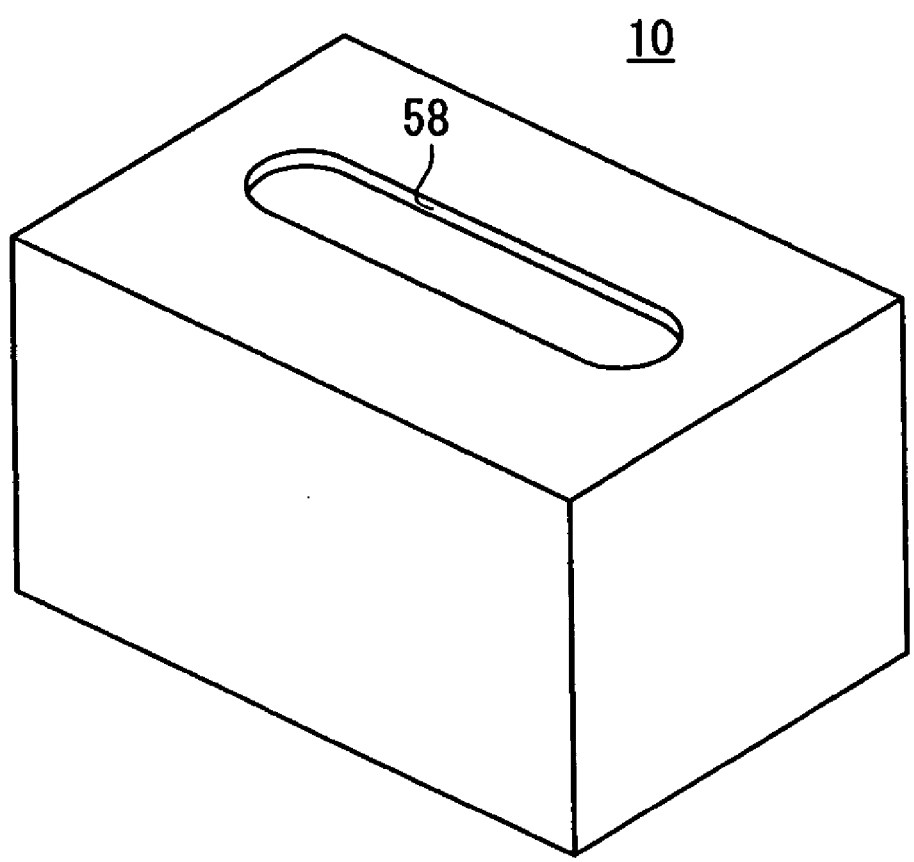
FIG. 11 is a schematic perspective view of a support jig having a recess in the form of an elongate groove.

As shown in FIG. 11, furthermore, the recess may be a recess 58 in the form of an elongate groove. The probe 8 is scanned to form an elongate land that is complementary in shape to the recess 58.

The entire space in the recesses 18, 52, 54, 58 may not be filled with the material of the stacked assembly 6.

The number of stacked workpieces is not limited to two. Rather, three or more workpieces may be stacked together.

Figure 12:
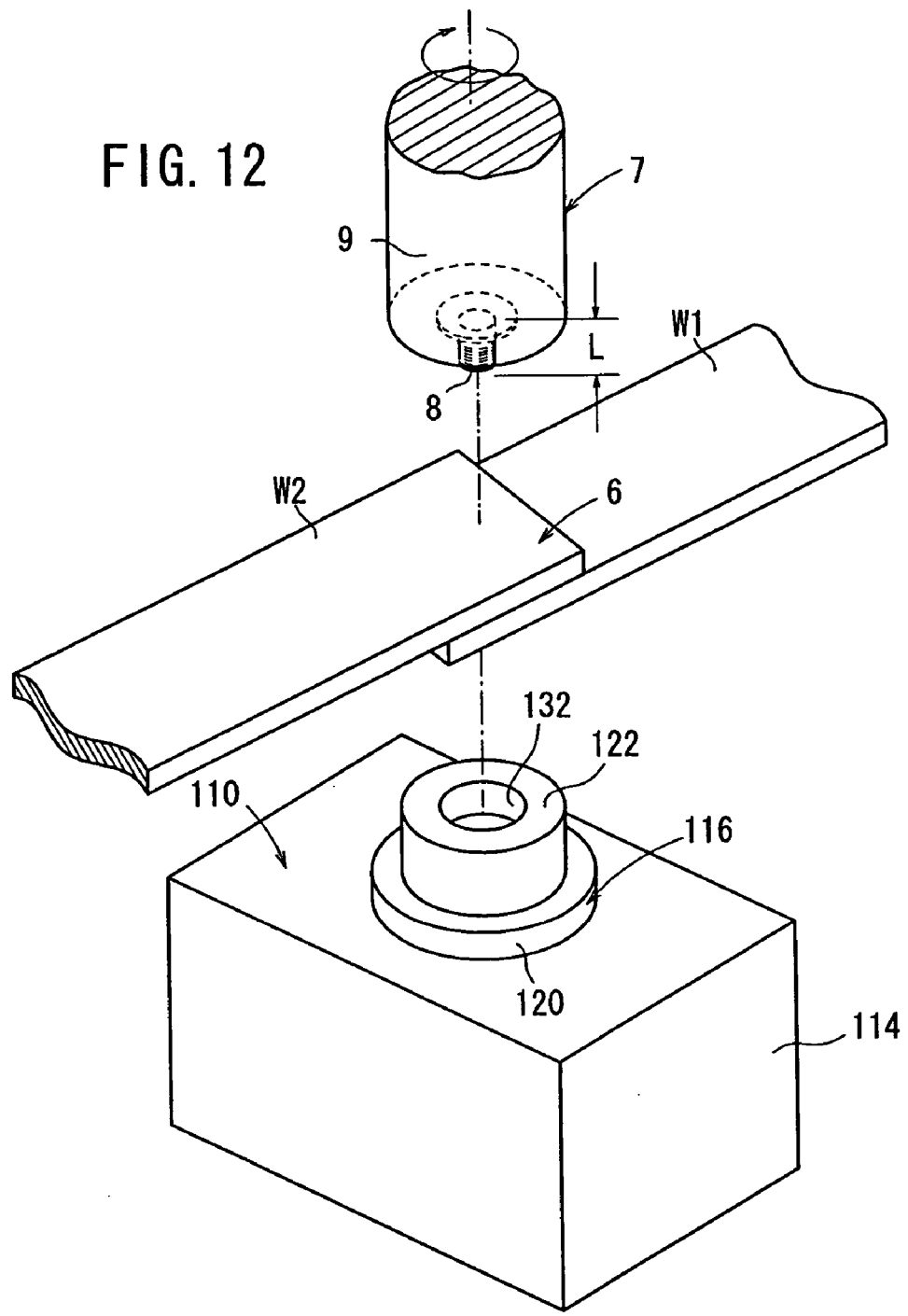
FIG. 12 is an enlarged fragmentary schematic perspective view of a friction stir welding jig according to a second embodiment of the present invention, a first workpiece and a second workpiece which are to be friction-stir-welded, and a friction stir welding tool.

A second embodiment will be described below. According to the second embodiment, a friction stir welding jig 110 which is shown in enlarged fragmentary schematic perspective in FIG. 12 is employed. The friction stir welding jig 110 has a support jig 114 having an insertion recess 112 shown in FIG. 13 and a placement jig 116 inserted in the insertion recess 112.

Figure 14:
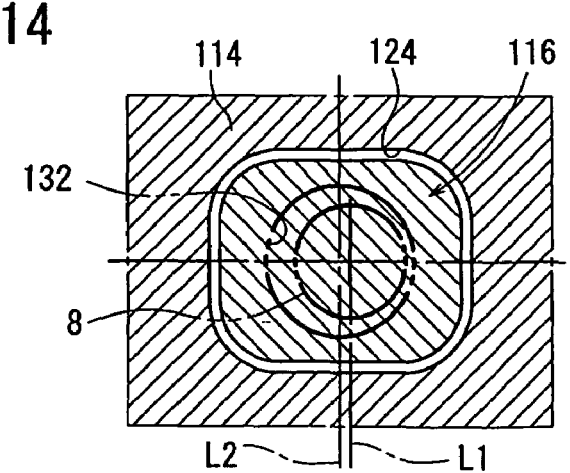
FIG. 14 is a schematic transverse cross-sectional view showing the manner in which the axis of a recess in the placement jig and the axis of a probe are not in alignment with each other.

The support jig 114 is substantially in the shape of a rectangular parallelepiped, and the insertion recess 112 is defined substantially centrally in an upper end face of the support jig 114. As shown in FIG. 14, the insertion recess 112 has a horizontal cross section having two parallel longer sides and two shorter sides extending perpendicularly to the longer sides, with arcuate edges interposed between the longer sides and the shorter sides.

Figure 13:
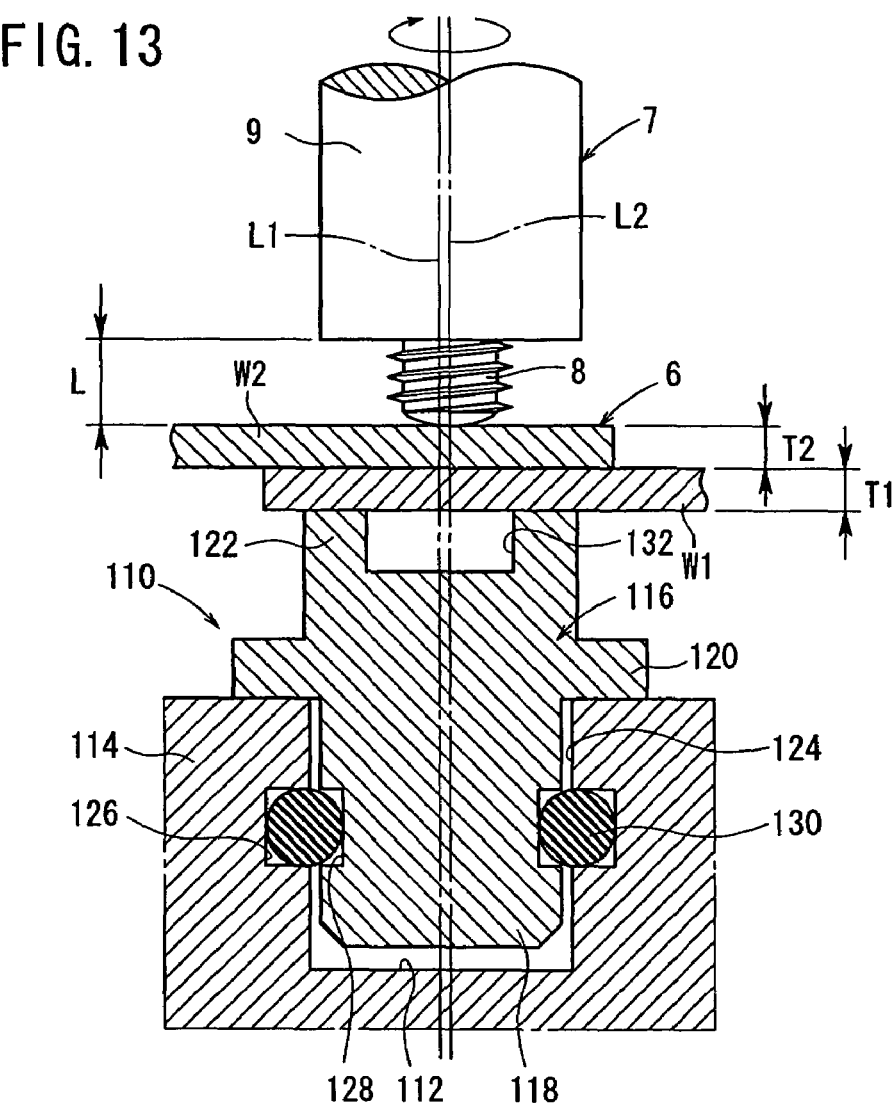
FIG. 13 is an enlarged view, partly in vertical cross section, showing the manner in which a stacked assembly is placed on a placement jig of the friction stir welding jig shown in FIG. 12.

As shown in FIG. 13, the placement jig 116 has a boss 118 which has a horizontal cross section similar in shape to the insertion recess 112 and which is slightly smaller in dimension than the insertion recess 112, a flange 120 greater in diameter than the insertion recess 112, and a placement block 122. The boss 118 is inserted in the insertion recess 112, and the flange 120 has a lower end face held against the upper end face of the support jig 114, retaining the placement jig 116 in position. Since the boss 118 is slightly smaller in dimension than the insertion recess 112, a clearance 124 is created between the inner peripheral wall of the insertion recess 112 and the side peripheral wall of the boss 118.

The inner peripheral wall of the insertion recess 112 and the side peripheral wall of the boss 118 have respective annular grooves 126, 128 defined therein. An O-ring 130 of rubber is inserted as an elastic body in the respective annular grooves 126, 128. Stated otherwise, the inner peripheral wall of the insertion recess 112 and the side peripheral wall of the boss 118 of the placement jig 116 are slightly spaced from each other with the O-ring 130 interposed therebetween.

The placement block 122 has a recess 132 defined in an upper end face thereof, the recess 132 having a substantially hollow cylindrical shape having a substantially circular horizontal cross-sectional shape (see FIG. 12).

As described later, the recess 132 in the placement block 122 is covered by the stacked assembly 6 which is made of the first workpiece W1 and the second workpiece W2 stacked together. The first workpiece W1 and the second workpiece W2 are supported by respective support bases, not shown, disposed in the vicinity of the friction stir welding jig 110.

As with the first embodiment, the friction stir welding tool 7 has a rotor 9 and a probe 8 coupled to an end of the rotor 9 and having a conically curved distal end. The probe 8 has an outside diameter smaller than the diameter of the recess 132 defined in the placement block 122. The length L of the probe 8, the thickness T1 of the first workpiece W1, and the thickness T2 of the second workpiece W2 are set respectively to about 2.5 mm, about 1.5 mm, and about 1.0 mm, for example.

The friction stir welding jig 110 according to the second embodiment is basically constructed as described above. Operation and advantages of the friction stir welding jig 110 will be described below in relation to a friction stir welding method according to the second embodiment.

The friction stir welding method according to the second embodiment is performed as follows.

First, as shown in FIG. 12, the first workpiece W1 and the second workpiece W2 are stacked into the stacked assembly 6, which is placed on the upper end face of the placement block 122 of the placement jig 116. At this time, the stacked assembly 6 covers the recess 132.

Then, as shown in FIG. 14, the friction stir welding tool 7 (the probe 8) is placed with its axis L2 being aligned as much as possible with the axis L1 of the recess 132. At this time, it is not necessary to hold the axis L1 and the axis L2 in complete alignment with each other.

Figure 15:
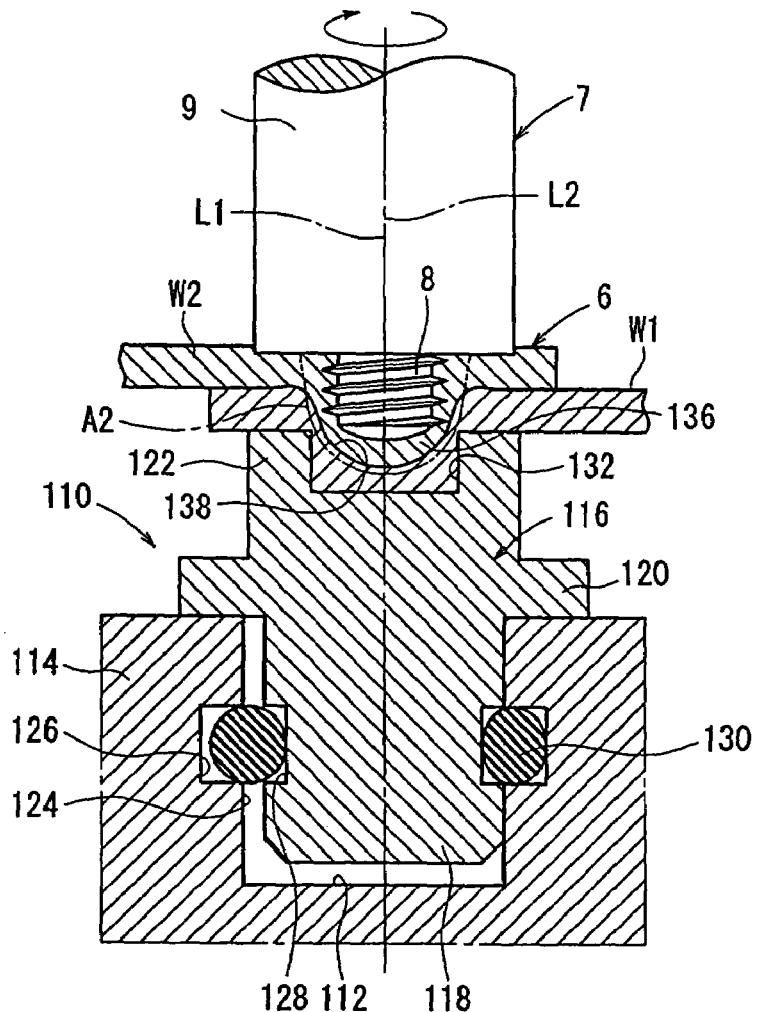
FIG. 15 is an enlarged view, partly in vertical cross section, showing the manner in which the axis of the recess in the placement jig and the axis of the probe are brought into substantial alignment with each other as the placement jig is displaced in an insertion recess.

After the probe 8 is lowered to a position that is spaced a predetermined distance from the stacked assembly 6, the probe 8 is rotated in unison with the rotor 9. As shown in FIG. 13, the probe 8 is then brought into sliding contact with the upper end face of the stacked assembly 6. As the probe 8 is held in sliding contact with the upper end face of the stacked assembly 6, frictional heat is generated to soften the area of the stacked assembly 6 contacted by the probe 8 and a nearby area thereof. As a result, as shown in FIG. 15, the probe 8 is embedded in the stacked assembly 6, and the material of the stacked assembly 6 flows into the recess 132. The material of the stacked assembly 6 easily flows into the recess 132 because the diameter of the horizontal cross section of the recess 132 is greater than the diameter of the probe 8, as described above.

Figure 16:
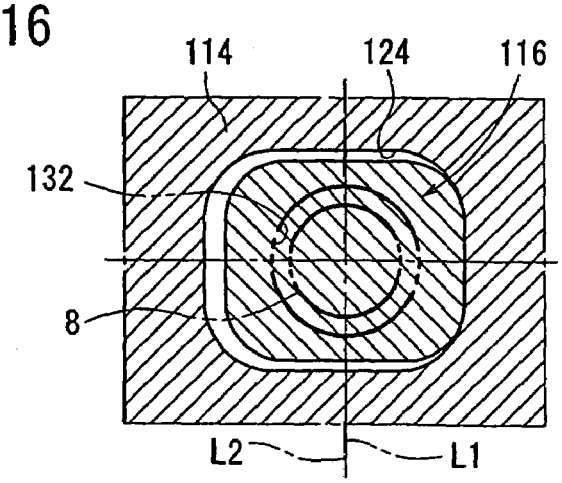
FIG. 16 is a schematic transverse cross-sectional view showing the manner in which the axis of the recess in the placement jig and the axis of the probe are held in substantial alignment with each other.

If the rotating probe 8 is embedded in the stacked assembly 6 out of alignment with the recess 132, and the material flows into the recess 132, a force perpendicular to the axis L1 or the axis L2, i.e., a horizontally directed force is applied to the placement jig 116. The force tends to act more greatly in a direction to reduce the misalignment between the probe 8 and the recess 132 than in a direction to increase the misalignment between the probe 8 and the recess 132. Under the force, therefore, the placement jig 116 is displaced horizontally in the insertion recess 112. As a result, as shown in FIGS. 15 and 16, the axis L1 and the axis L2 are ultimately held in alignment with each other.

When the placement jig 116 is thus displaced, the O-ring 130 as the elastic body is deformed. Therefore, the O-ring 130 does not prevent the placement jig 116 from being displaced.

According to the present embodiment, therefore, if the probe 8 is embedded in the stacked assembly 6 with the axis L2 being kept out of alignment with the axis L1 of the recess 132, then the placement jig 116 is displaced in a direction to bring the axis L1 and the axis L2 into alignment with each other. Therefore, when the probe 8 is embedded in the stacked assembly 6, it is not necessary to hold the axis L1 and the axis L2 in accurate alignment with each other. Stated otherwise, it is not necessary to perform a complicated coaxial alignment process before the friction stir welding process is carried out, and hence the efficiency of the friction stir welding process is increased.

Since the probe 8 is progressively embedded into the stacked assembly 6 while the axis L1 and the axis L2 are being substantially aligned with each other, the probe 8 is inserted substantially centrally into the recess 132 leaving a certain gap from the inner peripheral wall of the recess 132. Therefore, a region with a small gap and a region with a large gap between the side peripheral wall of the probe 8 and the inner peripheral wall of the recess 132 are not formed. The material around the probe 8 (the stirred region A2) is uniformly stirred, with the result that the extent of friction stir welding in the material remains uniform regardless of the region. Specifically, since there is no region where the amount of stirred material is small, there is no region where the bonding strength is small. For these reasons, the bonding strength of the stacked assembly 6 is increased.

As the material of the stacked assembly 6 flows into the recess 132, the material of the contacted region is stirred in a large amount.

As with the first embodiment, as the probe 8 is embedded, a protrusion 136 is formed on the surface of the second workpiece W2 which faces the first workpiece W1, and the cavity 138 is formed in the surface of the first workpiece W1 which faces the second workpiece W2. The protrusion 136 fits in the cavity 138. The lower end of the cavity 138 is an unstirred region (plastically deformed region) where the material does not flow plastically. That is, the lower end of the cavity 138 is shaped complementarily to the recess 132 due to plastic deformation, resulting in a tightly fit state. Because the first workpiece W1 and the second workpiece W2 are firmly joined together, the bonding strength is increased.

According to the second embodiment, the material pushed from the stacked assembly 6 by the embedding probe 8 flows plastically into the recess 132. Therefore, the material of the stacked assembly 6 does not rise, and hence does not produce any burrs. Using the placement jig 116 having the recess 132, the stacked assembly 6 can be friction-stir-welded without forming the burr BL.

Figure 17:
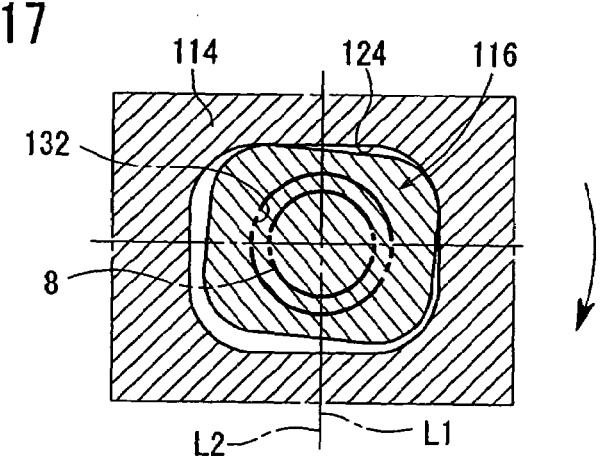
FIG. 17 is a schematic transverse cross-sectional view showing the manner in which the placement jig is prevented from rotating.

When the placement jig 116 is rotated in response to the rotation of the probe 8, the boss 118 has an outer wall interfering with an inner wall of the insertion recess 112, as shown in FIG. 17. Therefore, the placement jig 116 is prevented from being rotated, and the friction stir welding process is not obstructed.

Figure 18:
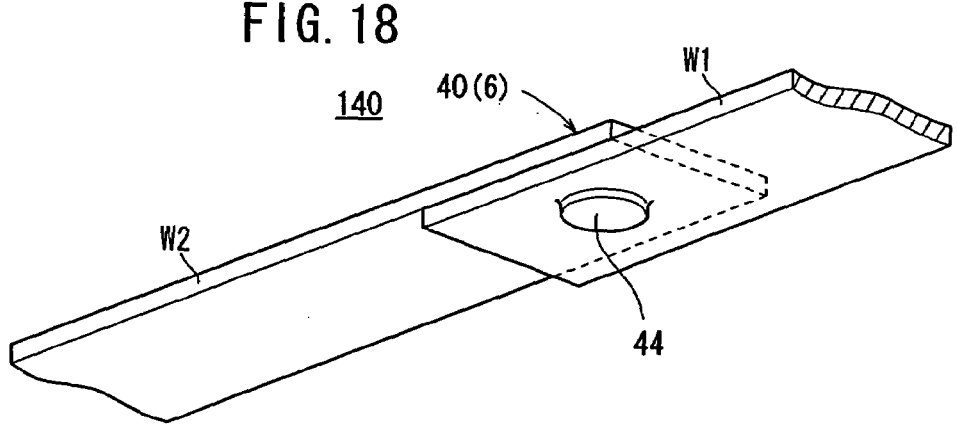
FIG. 18 is a fragmentary perspective view of a friction-stir-welded joint welded by a friction stir welding method according to the second embodiment.

When the probe 8 is released about two seconds after the stacked assembly 6 has started being stirred, thereby stopping the plastic flow of the material of the stacked assembly 6, the material of the stacked assembly 6 is ultimately cooled and solidified. In this manner, the first workpiece W1 and the second workpiece W2 are integrally joined together in a solid state, producing a member 140 with a friction-stir-welded joint 40, as shown in FIG. 18, as with the first embodiment (see FIG. 4). The member 140 with the friction-stir-welded joint 40 has a cylindrical land 44 that projects on the first workpiece W1 when the material that has flowed in the recess 132 is cooled and solidified. In this case, therefore, the land 44 whose outside diameter is essentially the same as the diameter of the recess 132 is produced.

The recess defined in the placement block 122 is not limited to the cylindrical recess 132. The recess may be in the form of an elongate groove. The probe 8 is scanned to form an elongate land that is complementary in shape to the elongate groove.

The entire space in the recess 132 may not need to be filled with the material of the stacked assembly 6.

The number of stacked workpieces is not limited to two. Rather, three or more workpieces may be stacked together.

Figure 19:
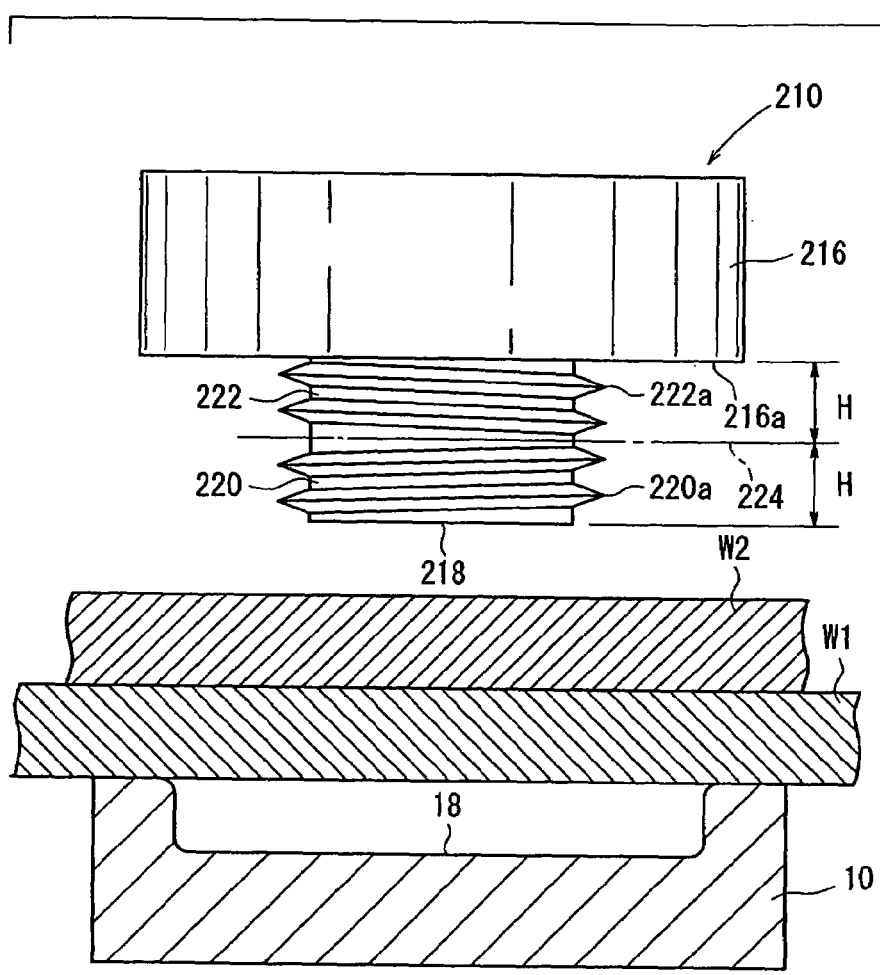
FIG. 19 is a side elevational view of another friction stir welding tool and workpieces which can be used in the first embodiment or the second embodiment.

In the first embodiment and the second embodiment described above, a friction stir welding tool 210 shown in FIG. 19 may be employed. With respect to the first embodiment, the friction stir welding tool 210 serves to join the stacked assembly 6 of the first workpiece W1 and the second workpiece W2 by way of friction stir welding. The friction stir welding tool 210 has a rotor 216 for pressing the upper second workpiece W2 and a probe 218 disposed coaxially on the tip end of the rotor 216 for being embedded in the stacked assembly 6. As with the first embodiment, the stacked assembly 6 is fixedly mounted on the support jig 10 having the recess 18. The inside diameter of the recess 18 is greater than the outside diameter of the probe 218, and the recess 18 and the probe 218 are disposed coaxially with each other.

The probe 218 has a first screw section 220 in the shape of a right-hand helical thread disposed on a tip end thereof and a second screw section 222 in the shape of a left-hand helical thread that is positioned behind the first screw section 220. The probe 218 thus constructed may be made of high-speed tool steel, for example.

For performing a friction stir welding process, the friction stir welding tool 210 is rotated clockwise as viewed from above the rotor 216.

The distance H from a boundary line 224 between the first screw section 220 and the second screw section 222 to an end face 216a of the rotor 216 is equal to a value produced by subtracting a width H1, to be described later, from the thickness of the second workpiece W2 on the face side. Since the width H1 is a small value, the distance H may practically be set as being equal to the thickness of the second workpiece W2.

Figure 20:
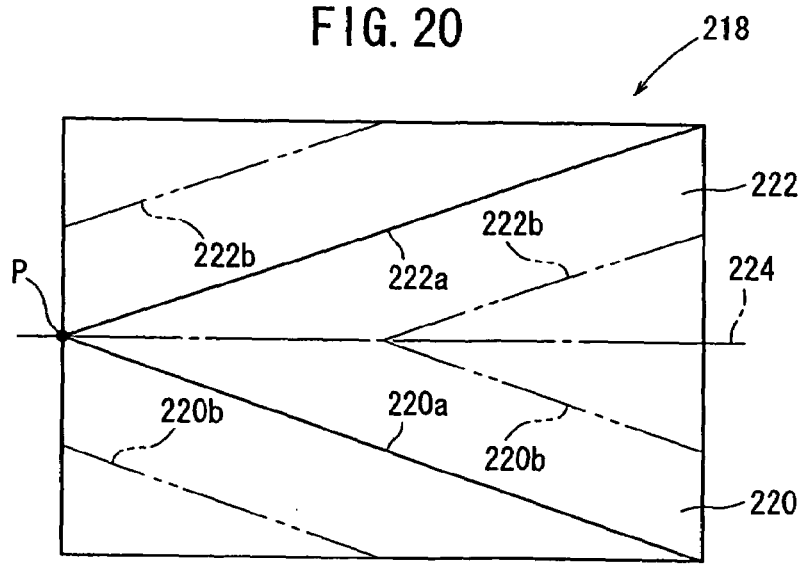
FIG. 20 is a development diagram showing a side surface of the probe of the friction stir welding tool.

The thread 220a of the first screw section 220 and the thread 222a of the second screw section 222 are contiguous. Specifically, as shown in FIG. 20 which schematically illustrates a side of the probe 218 in a developed fashion, the thread 220a and the thread 222a are connected to each other at a point P on the boundary line 224. A narrow groove or the like may be provided between the thread 220a and the thread 222a, insofar as the thread 220a and the thread 222a may be essentially joined to each other at the point P.

The first screw section 220 and the second screw section 222 may have two threads each, including threads 220b, 222b, respectively, other than the thread 220a and the thread 222a.

As can be seen from FIGS. 19 and 20, the screw pitches of the first screw section 220 and the second screw section 222 are equal to each other, and the axial lengths H of the first screw section 220 and the second screw section 222 are equal to each other. In FIG. 20, the thread 220a and the thread 222a are symmetrical in shape with respect to the boundary line 224.

In FIGS. 19 and 20, the boundary line 224 is hypothetically shown by a dot-and-dash line for illustrative purpose. However, the boundary line 224 is actually not present.

A process of friction-stir-welding the stacked assembly 6 using the friction stir welding tool 210 will be described below.

The stacked assembly 6 of the first workpiece W1 and the second workpiece W2 is placed on the support jig 10 in covering relation to the recess 18, as shown in FIG. 19. Thereafter, the friction stir welding tool 210 positioned above the stacked assembly 6 is rotated. In this case, the friction stir welding tool 210 is rotated clockwise.

Figure 21:
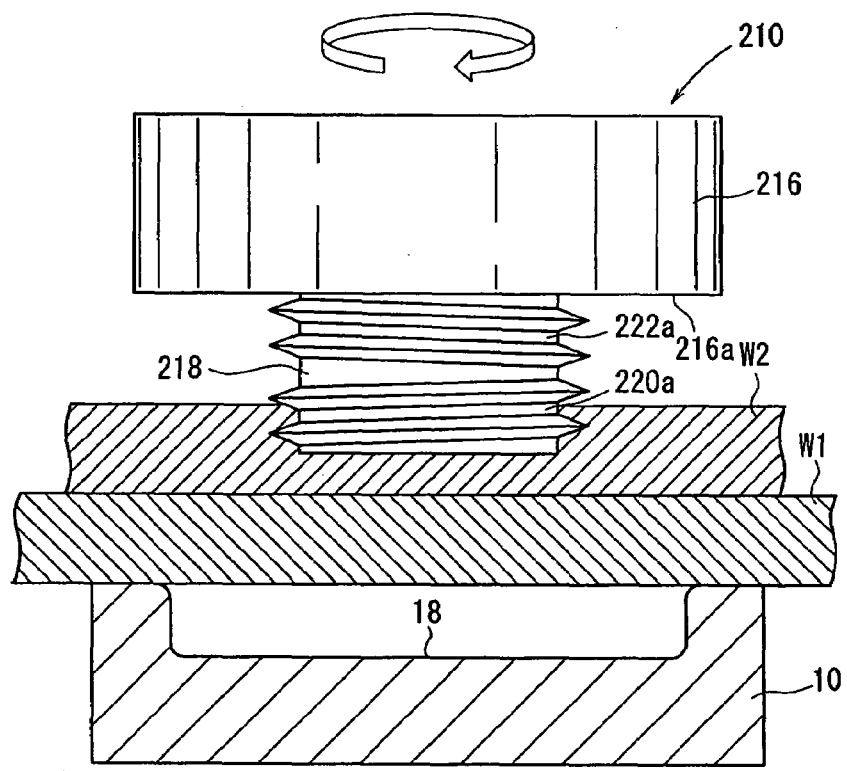
FIG. 21 is a side elevational view, partly in cross section, showing the manner in which the tip end of the probe of the friction stir welding tool is embedded in a stacked assembly.

Then, as shown in FIG. 21, the friction stir welding tool 210, while rotating, is lowered to press and embed the probe 218 into the stacked assembly 6 (the upper second workpiece W2). At this time, since the first screw section 220 on the tip end of the probe 218 is in the form of a right-hand thread, the probe 218 is smoothly embedded into the second workpiece W2 as if it were inserted as a bolt (or a self-tapping screw).

In the friction stir welding process, a certain pressing force is initially required to bring the friction stir welding tool 210 into contact with the surface of the second workpiece W2 and to cause the friction stir welding tool 210 to start being embedded into the second workpiece W2. As the probe 218 is smoothly embedded into the second workpiece W2 by the action of the first screw section 220, the pressing force required for the friction stir welding tool 210 is small, and the friction stir welding tool 210 has an increased service life.

Figure 22:
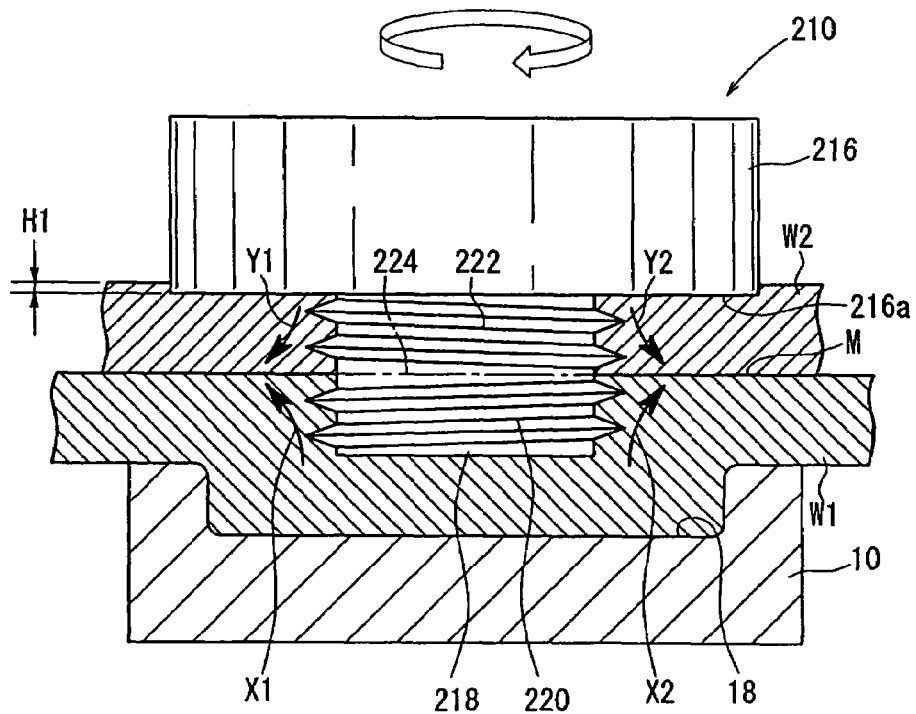
FIG. 22 is a side elevational view, partly in cross section, showing the manner in which the probe is embedded in the stacked assembly until the end face of a hollow cylindrical portion of the friction stir welding tool abuts against the second workpiece.

As shown in FIG. 22, the friction stir welding tool 210 is further lowered until the end face 216a of the rotor 216 bites into the surface of the second workpiece W2 by the small width H1. At this time, while the friction stir welding tool 210 is rotating clockwise, since the second screw section 222 is in the form of a left-hand thread, the second screw section 222 develops a resistive force for resisting the insertion thereof into the second workpiece W2. The resistive force increases as the second screw section 222 is progressively embedded into the second workpiece W2.

Because the first screw section 220 is in the form of a right-hand thread, as described above, when the friction stir welding tool 210 is rotated clockwise, the first screw section 220 produces a force with which it moves downwardly. As the screw pitches of the first screw section 220 and the second screw section 222 are equal to each other, and the axial lengths H of the first screw section 220 and the second screw section 222 are equal to each other, the force with which the first screw section 220 moves downwardly and the resistive force generated by the second screw section 222 are eventually brought into balance.

At least until the boundary line 224 reaches the surface of the second workpiece W2, the probe 218 is smoothly embedded into the second workpiece W2 and the first workpiece W1 by the action of the first screw section 220. This is advantageous in that the pressing force generated by the actuator may be small.

When the probe 218 is rotated and lowered, an upwardly lifting force from the first screw section 220 is applied to the second workpiece W2 and the first workpiece W1, and the second workpiece W2 and the first workpiece W1 are also pressed downwardly by the second screw section 222. Therefore, the second workpiece W2 and the first workpiece W1 are prevented from being lifted.

Then, after the friction stir welding tool 210 is lowered until the end face 216a bites into the second workpiece W2 by the width H1, the friction stir welding tool 210 stops being lowered while still rotating. At this time, the force with which the first screw section 220 moves downwardly and the resistive force generated by the second screw section 222 are held in balance, preventing the probe 218 from being lowered unnecessarily. The boundary line 224 between the first screw section 220 and the second screw section 222 of the probe 218 is aligned with the boundary line M between the second workpiece W2 and the first workpiece W1. The boundary line 224 and the boundary line M should be substantially aligned with each other.

In this case, the plastically flowing material of the stacked assembly 6 flows into the recess 18 of the support jig 10, resulting in an increased stirred region in the stacked assembly 6. That is, the material of the stacked assembly 6 is largely stirred, cooled, and solidified, producing a member 42 (see FIG. 4) with a friction-stir-welded joint having excellent bonding strength.

As schematically indicated by the arrows X1, X2 in FIG. 22, the material of the lower first workpiece W1 in a region near the probe 218 is lifted upwardly by the first screw section 220. As schematically indicated by the arrows Y1, Y2 in FIG. 22, the material of the face-side second workpiece W2 in a region near the probe 218 is pushed downwardly by the second screw section 222.

Figure 23:
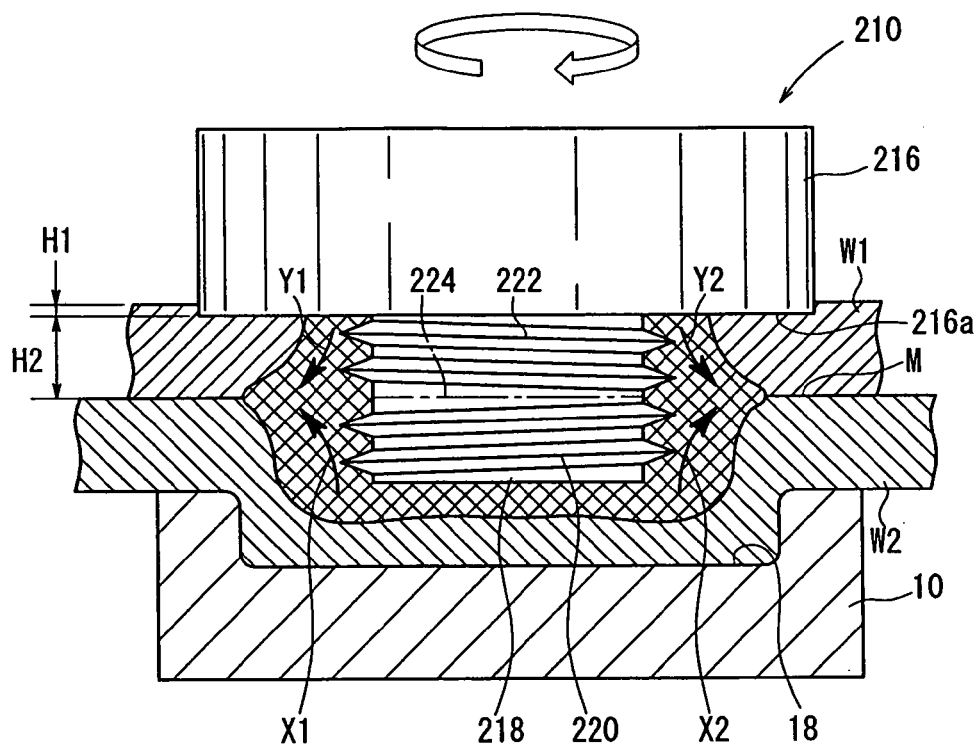
FIG. 23 is a side elevational view, partly in cross section, showing the manner in which the probe is embedded in the stacked assembly until the end face of the hollow cylindrical portion of the friction stir welding tool abuts against the second workpiece, and the material flows plastically.

Then, as shown in FIG. 23, plastic material flow occurs in the second workpiece W2 in the directions indicated by the arrows Y1, Y2, and plastic material flow occurs in the first workpiece W1 in the directions indicated by the arrows X1, X2. These plastic material flows are uniform plastic material flows along the directions indicated by the arrows X1, X2, Y1, and Y2. A region that is shown cross-hatched in FIG. 23 (and FIG. 24 to be described later) schematically represents an area where the plastic material flows occur.

The material flow that is lifted upwardly by the first screw section 220 and the material flow that is pushed downwardly by the second screw section 222 are combined with each other in the vicinity of the boundary line 224, and pushed radially outwardly along the boundary line M.

Inasmuch as the screw pitches of the first screw section 220 and the second screw section 222 are equal to each other, and the axial lengths H of the first screw section 220 and the second screw section 222 are equal to each other as described above, the plastic material flow caused by the first screw section 220 and the plastic material flow caused by the second screw section 222 caused in balance, promoting plastic material flow near the boundary line 224.

The second workpiece W2 and the first workpiece W1 are thus stirred primarily in their regions near the boundary line M, and the second workpiece W2 and the first workpiece W1 are reliably joined over a wide area without being thinned down. Particularly, since the threads 220a, 222a of the first screw section 220 and the second screw section 222 of the probe 218 are connected to each other at the point P (see FIG. 20), the plastic material flow in the vicinity of the boundary line M is promoted to push the material flow more outwardly.

As the second workpiece W2 is prevented from being thinned down, the height H2 of the joint becomes substantially equal to the thickness of the second workpiece W2. Therefore, the load is distributed to a wide area for an increased bonding strength. Because the region at the boundary line M is stirred and joined over a wide area, the tensile strength as well as the shear force are increased.

Furthermore, since the region of the upper second workpiece W which is close to the probe 218 plastically flows so as to be depressed downwardly by the second screw section 222, the material flow does not bulge onto the surface of the second workpiece W2, and hence the second workpiece W2 is prevented from forming burrs.

After the stacked assembly 6 is friction-stir-welded, the friction stir welding tool 210 is elevated to release the probe 218 from the stacked assembly 6. The second workpiece W2 and the first workpiece W1 are spot-welded in the area where the friction stir welding tool 210 was embedded.

Figure 25:
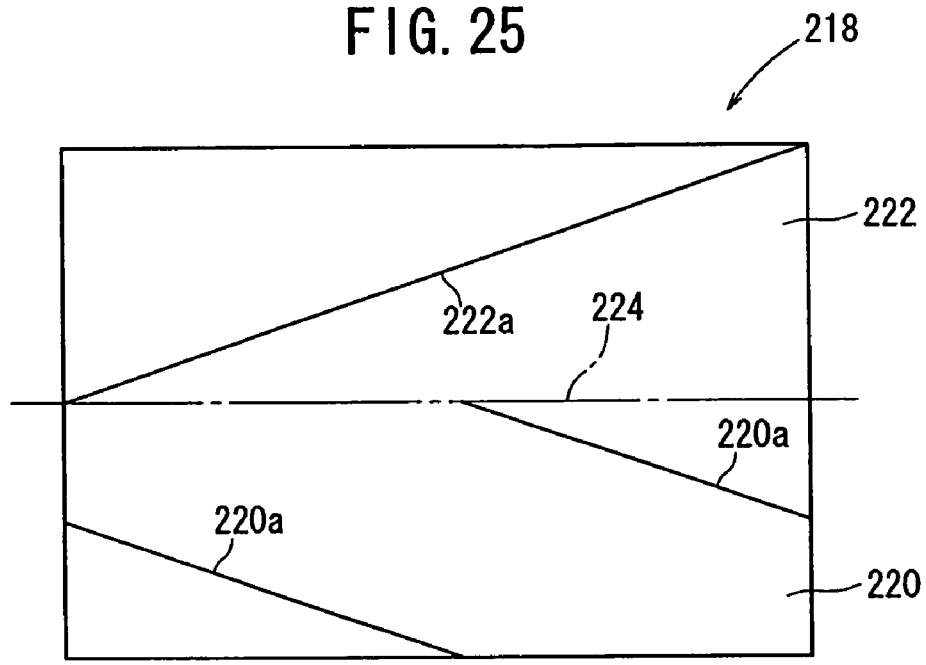
FIG. 25 is a development diagram showing a side surface of a probe of still another friction stir welding tool.
Figure 26:
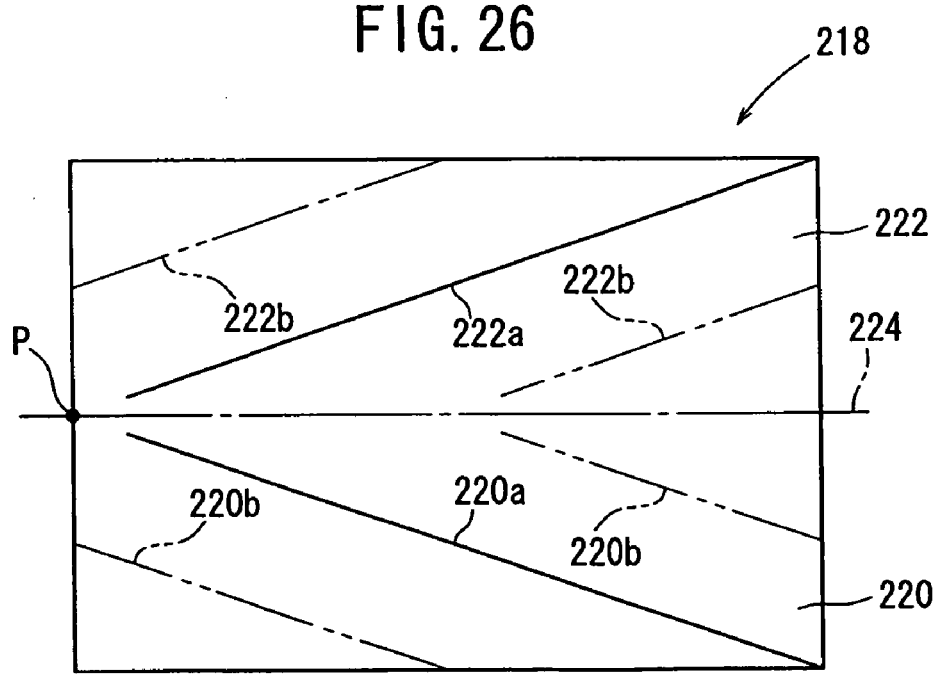
FIG. 26 is a development diagram showing a side surface of a probe of yet another friction stir welding tool.

In the above description, the thread 220a of the first screw section 220 and the thread 222a of the second screw section 222 are connected to each other at the point P (see FIG. 20). If necessary, however, a tip end of the thread 220a and a tip end of the thread 222a may circumferentially be spaced from each other, as shown in FIG. 25. Alternatively, a tip end of the thread 220a and a tip end of the thread 222a, and a tip end of the thread 220b and a tip end of the thread 222b may axially be slightly spaced from each other, as shown in FIG. 26.

Figure 24:
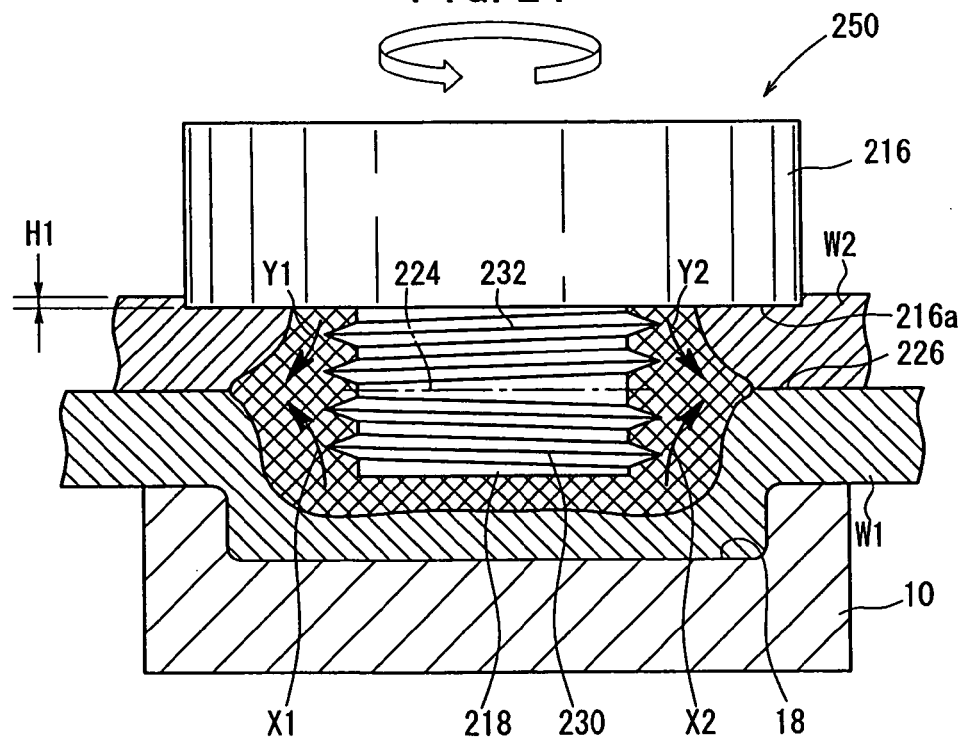
FIG. 24 is a side elevational view, partly in cross section, of another friction stir welding tool and workpieces.

If the friction stir welding tool 210 is rotated counterclockwise, then friction stir welding tends to occur in a small area at the boundary line M, and the surface of the second workpiece W2 is liable to develop burrs. To eliminate these drawbacks, if the friction stir welding tool is rotated counterclockwise, it is preferable to employ a friction stir welding tool 250 having screw sections oriented in directions opposite to the above directions, as shown in FIG. 24.

Specifically, the friction stir welding tool 250 has a first screw section 230 in the shape of a left-hand thread, which corresponds to the first screw section 220 of the friction stir welding tool 210, and a second screw section 232 in the shape of a right-hand thread, which corresponds to the second screw section 222. Since the screw sections of the friction stir welding tool 250 are oriented in the directions opposite to that of the friction stir welding tool 210, when the friction stir welding tool 250 is rotated counterclockwise, the friction stir welding tool 250 offers the same advantages as the friction stir welding tool 210.

Figure 27:
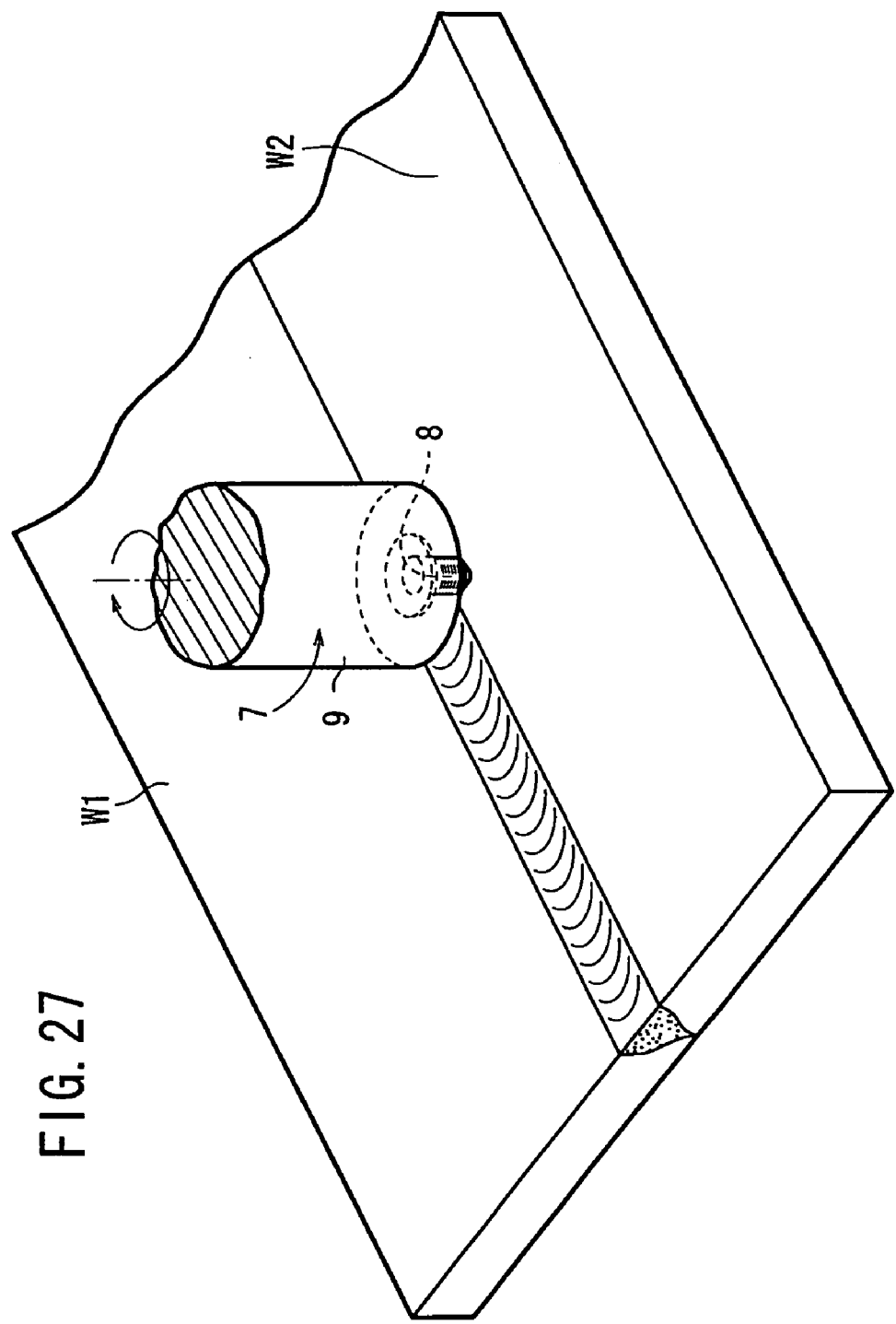
FIG. 27 is a perspective view showing the manner in which workpieces having end faces held in abutment against each other are friction-stir-welded using a friction stir welding tool.

Objects to be joined by the friction stir welding tools 210, 250 are not limited to the stacked assembly 6 described above. As shown in FIG. 27, for example, abutting end surfaces of the first workpiece W1 and the second workpiece W2 may be friction-stir-welded. The abutting end surfaces can continuously be friction-stir-welded when the friction stir welding tools 210, 250 are moved along the abutting end surfaces.

In the above description, the upward and downward directions have been noted according to the drawings for the sake of convenience. However, the first workpiece W1 and the second workpiece W2 may be oriented in any desired directions. The friction stir welding tools 7, 210, 250 may be pressed and embedded at a substantially right angle with respect to the stacked assembly 6.

The present invention is not limited to the embodiments described above, but may be embodied in various arrangements without departing from the scope of the present invention.

The invention claimed is:

1. A friction stir welding method for supporting a stacked assembly made up of a plurality of members with a placement jig which has a recess defined in an upper end face thereof, and embedding a probe of a friction stir welding tool into an upper end face of said stacked assembly to friction-stir-weld said stacked assembly, comprising the step of:

rotating and embedding said probe into said upper end face of said stacked assembly toward said recess of said placement jig so as to displace said placement jig in a direction to bring the center of said recess into alignment with the center of said probe to friction-stir-weld said stacked assembly over said recess.

2. A friction stir welding jig for friction-stir-welding a stacked assembly made up of a plurality of members, comprising:

a probe of a friction stir welding tool to friction-stir-weld said stacked assembly from an upper end face thereof;

a placement jig having a recess defined in an upper end face thereof, for placing said stacked assembly thereon; and, a support jig displacably supporting said placement jig in a direction to bring the center of said recess into alignment with the center of said probe when said probe is rotated and embedded into the upper end face of said stacked assembly toward said recess of said placement jig to friction-stir-weld said stacked assembly over said recess.

* * * * *